(12) United States Patent
King

(10) Patent No.: US 12,695,261 B1
(45) Date of Patent: Jul. 28, 2026

(54) HAND-MANIPULATED TOOL FOR ASSEMBLING ELECTRICAL CONNECTORS

(71) Applicant: Kevin King, Meridian, ID (US)

(72) Inventor: Kevin King, Meridian, ID (US)

( * ) Notice: Subject to any disclaimer, the term of this patent is extended or adjusted under 35 U.S.C. 154(b) by 0 days.

(21) Appl. No.: 19/429,420

(22) Filed: Dec. 22, 2025

(51) Int. Cl.
| | |
|---|---|
| *B23P 19/00* | (2006.01) |
| *H01R 43/00* | (2006.01) |
| *H01R 43/22* | (2006.01) |
| *H01R 43/26* | (2006.01) |
| *H02S 40/36* | (2014.01) |

(52) U.S. Cl.
CPC ........... *H01R 43/22* (2013.01); *H01R 43/005* (2013.01); *H01R 43/26* (2013.01); *H02S 40/36* (2014.12)

(58) Field of Classification Search
CPC ...... H01R 43/22; H01R 43/005; H01R 43/26; H02S 40/36
See application file for complete search history.

(56) References Cited

U.S. PATENT DOCUMENTS

| | | | |
|---|---|---|---|
| 4,360,967 A | 11/1982 | Luzzi et al. | |
| 5,012,704 A | 5/1991 | Wing | |
| 6,349,625 B1 | 2/2002 | Poganski | |
| 6,637,298 B1 | 10/2003 | O'Brien | |
| 6,887,102 B1 | 5/2005 | Burris et al. | |
| 7,080,581 B2 | 7/2006 | Reese | |
| 7,147,509 B1 | 12/2006 | Burris et al. | |
| 9,331,213 B2 * | 5/2016 | Black | H02S 40/36 |
| 11,731,247 B2 | 8/2023 | Chen | |

| | | | |
|---|---|---|---|
| 12,272,918 B1 * | 4/2025 | King | H01R 43/22 |
| 2006/0117915 A1 | 6/2006 | Hui | |
| 2007/0298653 A1 | 12/2007 | Mahoney | |
| 2010/0199813 A1 | 8/2010 | Phillips | |
| 2010/0258157 A1 * | 10/2010 | Arai | H01R 13/52 |
| | | | 136/244 |

(Continued)

FOREIGN PATENT DOCUMENTS

| | | |
|---|---|---|
| AU | 2010101368 A4 | 1/2011 |
| CN | 207303569 U | 5/2018 |
| CN | 212323803 U | 1/2021 |

(Continued)

OTHER PUBLICATIONS

Solarline Catalog, Multi-Contact MC, pp. 62 and 63, Jul. 2015, Staubli Group, Allschwil, Switzerland.

(Continued)

*Primary Examiner* — Paul D Kim
(74) *Attorney, Agent, or Firm* — Stone Creek Services LLC; Alan M Flum

(57) ABSTRACT

An electrical connector installation tool for PV cable electrical connectors. The electrical connector installation tool includes a separate end cap tool and main body tool. The end cap tool and the main body tool may be structured to be hand gripped and hand turned around their respective tool bodies. The main body tool may include a torque limiter that prevents overtightening of the screw-on end cap. To accommodate different electrical connectors of different sizes, or different types, the end cap tool may include a pair of end cap sockets positioned on opposite ends of a hollow interior within the end cap tool. For example, the end cap tool may be structured to engage an MC4-type PV electrical connector on one end and an H4-type PV electrical connector on the other end.

3 Claims, 21 Drawing Sheets

(56) References Cited

U.S. PATENT DOCUMENTS

| | | |
|---|---|---|
| 2013/0192039 A1 | 8/2013 | Trusty |
| 2024/0139914 A1 | 5/2024 | Fuentes |

FOREIGN PATENT DOCUMENTS

| | | |
|---|---|---|
| CN | 218648485 U | 3/2023 |
| CN | 219967780 U | 11/2023 |

OTHER PUBLICATIONS

Tools and accessories, Renewable Energy | Solar Photovoltaics, p. 23, (Socket wrench insert), Feb. 2024, Staubli International AG, Allschwil Switzerland.
Stabuli TBH Zonn PV-WZ-AD-GWD 32-6006, BengShop, downloaded from the Internet from https://www.bengshop.nl/staubli-tbh-zonn-pv-wz-ad-gwd-32-600632-6006-art/ on Jun. 6, 2024.
Solar Line Photovoltaic Interconnection System, ICS 18-11, p. 34, Aug. 2017, Amphenol Industrial Solar Technologies.
The Complete Guide for Solar Panel Connectors, Solar Magazine, Oct. 26, 2022, downloaded from the Internet from: https://solarmagazine.com/solar-installation/solar-panel-connectors/ on Oct. 1, 2025.
Amphenol Industrial Connector Installation Instructions PV Connector H4 Pro Series, AI-24-2, March 2025, Amphenol Industrial Operations, Endicott, New York, downloaded from the Internet from https://amphenol-industrial.com/wp-content/uploads/amphenol/h4-pro-series-assembly-instructions-ai-24.pdf on Nov. 12, 2025.
Solar Tool Guide, Jun. 2024, Amphenol Industrial Operations, Endicott, New York, downloaded from the Internet from https://amphenol-industrial.com/wp-content/uploads/amphenol/solar-tool-guide-qr-3.pdf on Nov. 12, 2025.
T4-PC1 Connector, PV Connector Datasheet V5.59_EN, Aug. 2017, Tlian (Changshu) Co., Ltd, Changshu, China downloaded from the Internet from https://www.canadiansolar.com/wp-content/uploads/2019/12/Datasheet_T4-PC-1.pdf on Nov. 12, 2025.
Solar Connector Assembly Tool, Apr. 2025, King Products, a subsidiary of creare Industries LLC, Meridian Idaho, downloaded from the Internet from https://kingproductsusa.com/connector-assembly-tool on Nov. 13, 2025.
Solar Connector Assembly Tool, Apr. 2025, Solar Tools USA, a subsidiary of creare Industries LLC, Meridian Idaho, downloaded from the Internet from https://solartoolsusa.com/solar-connector-assembly-tool/#product-description on Nov. 13, 2025.

* cited by examiner

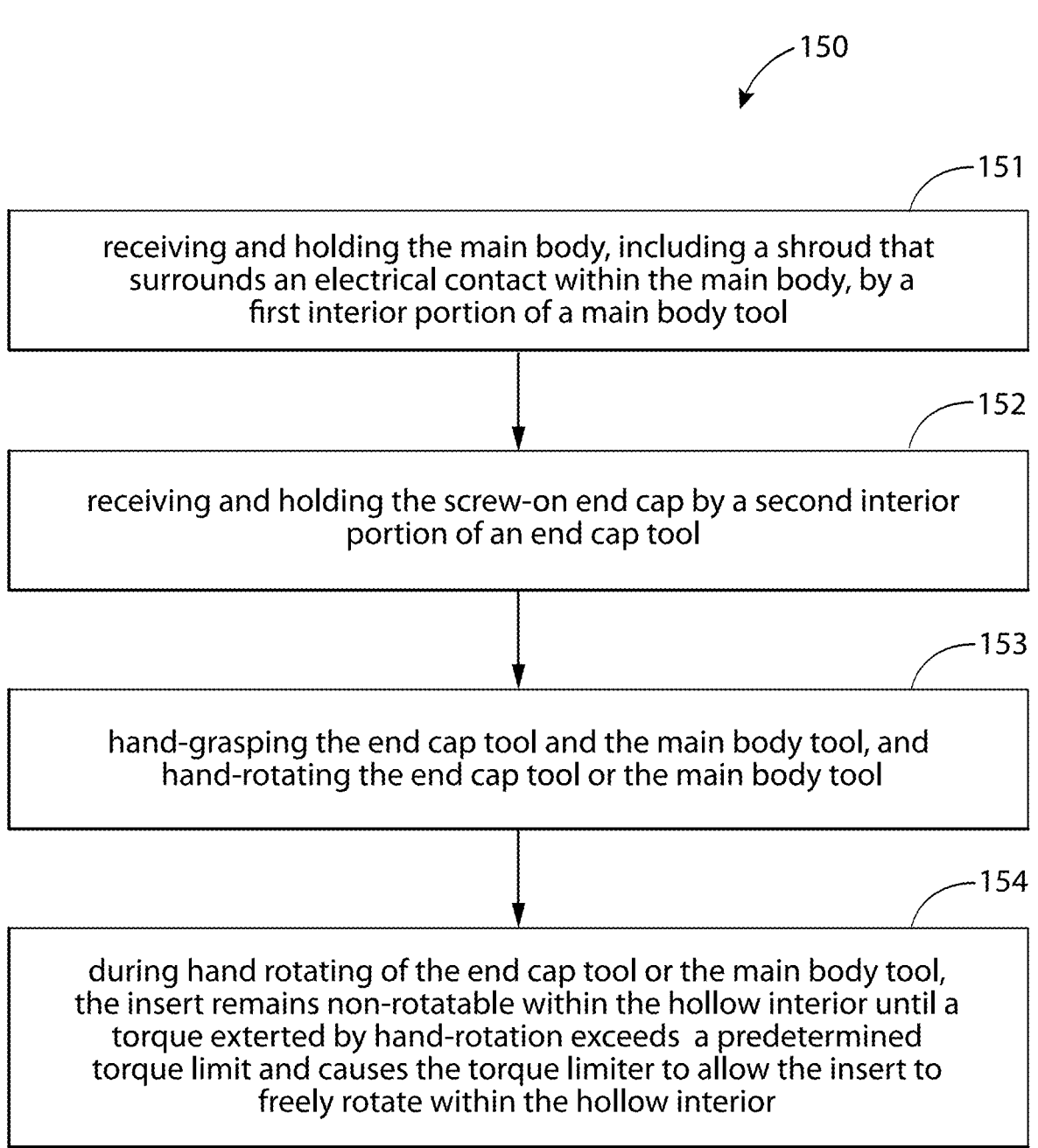

150

151 receiving and holding the main body, including a shroud that surrounds an electrical contact within the main body, by a first interior portion of a main body tool

152 receiving and holding the screw-on end cap by a second interior portion of an end cap tool

153 hand-grasping the end cap tool and the main body tool, and hand-rotating the end cap tool or the main body tool

154 during hand rotating of the end cap tool or the main body tool, the insert remains non-rotatable within the hollow interior until a torque exterted by hand-rotation exceeds a predetermined torque limit and causes the torque limiter to allow the insert to freely rotate within the hollow interior

FIG. 32

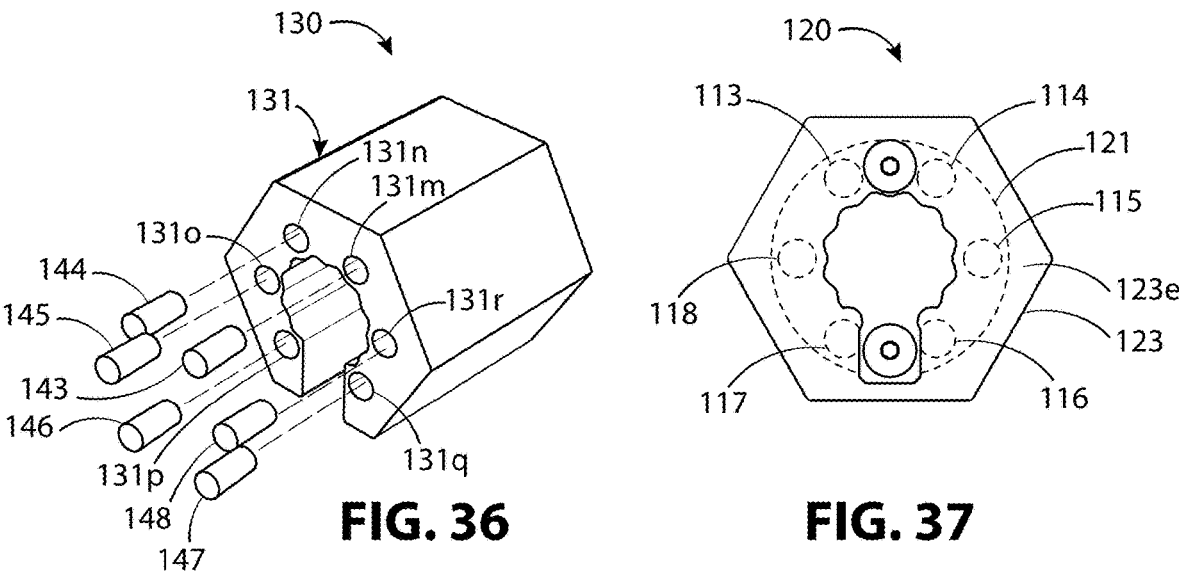
FIG. 36       FIG. 37
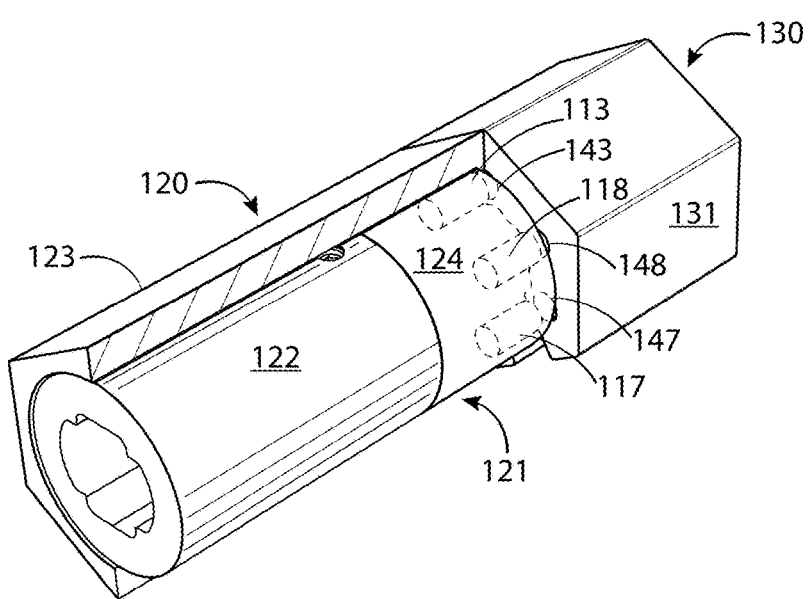
FIG. 38

HAND-MANIPULATED TOOL FOR ASSEMBLING ELECTRICAL CONNECTORS

FIELD OF DISCLOSURE

This disclosure relates to the field of metal working and to a tool for assembling electrical devices. Specifically, this disclosure relates to a tool for assembling electrical connectors. The tool comprises a hand-manipulatable implement.

BACKGROUND

Single-conductor electrical connectors used for connecting together wires between photovoltaic (PV) panels typically include a male electrical connector that electrically engages a female electrical connector. Examples of PV electrical connectors include MC4, MC4-EVO, which are both registered trademarks of Stäubli Electrical Connectors AG, H4 by Amphenol, and T4 by Than (Changshu) Co., Ltd. These PV electrical connectors meet various safety standards such as UL-6703 and IEC-62852 and water tightness standards such as IP68.

Male and female PV electrical connectors may typically include an insulated main body, an electrical contact pin, an elastomeric water seal, and a screw-on end cap. The screw-on end caps may generally provide a watertight seal.

Installers typically use specialized hand tools, such as a MC4-type connector wrench or an H4-type connector wrench, to install the screw-on end cap to their respective male and female main bodies.

SUMMARY

The Inventor identified the following problems related to installing PV electrical connectors during PV system installation. The Inventor observed that installers may overtighten and damage screw-on end caps or main bodies of PV electrical connectors during installation using conventional tools. The Inventor observed that holding a conventional PV electrical connector wrench by a handle, such as MC4-type connector wrench, does not provide sufficient tactile feedback to prevent overtightening. This can be made worse by the moment arm of the wrench's handle, that can provide too much torque.

The Inventor also observed that using these tools can be awkward and could damage the electrical wire. Tightening an MC4-type PV electrical connector requires two conventional MC4-type connector wrenches, one for holding and turning the screw-on end cap, and the other for holding the main body of the MC4-type PV electrical connector. Holding two wrenches requires two hands. An installer may find it difficult to hold the two MC4-type connector wrenches at a perpendicular angle to the electrical wire while maintaining pressure on the electrical wire to prevent it from moving or twisting. Moving or twisting of the electrical wire can damage the electrical wire or pull the wire loose from the electrical contact pin. These problems may be made worse by low clearance between the installed PV panels and the roof, which makes it difficult to manipulate handled tools.

In addition, conventional MC4-type connector wrenches are not compatible with many non-MC4-type PV electrical connectors, like H4-type PV electrical connectors. H4-type PV electrical connectors require a different tool for securing their screw-on end caps than MC4-type PV electrical connectors.

In addition, the Inventor observed that installers may misplace the installation tools, which can be inconvenient, especially when the installation is on a roof and spare tools are on the ground. The Inventor observed this problem may be compounded by having to use multiple tools for different types of PV electrical connectors. For example, one jobsite may require using H4-type PV electrical connectors. Another jobsite may require MC4-type PV electrical connectors. This creates an additional burden for the installer to have the correct tool on both the roof and on the jobsite.

The Inventor developed a PV electrical connector installation tool that solves the above-mentioned problems. This tool may include two sub-tools, a main body tool and an end cap tool that is separate from the main body tool. The main body tool is structured to engage the main body of a PV electrical connector. The end cap tool is structured to hold and turn a screw-on end cap of a PV electrical connector. The installer grasps the main body tool in one hand and the end cap tool in the other hand. An insert, within the outer shell of the main body tool, receives and holds a portion of the main body of the PV electrical connector. The end cap tool receives and holds the screw-on end cap of the same PV electrical connector. The installer hand-grasps the end cap tool and the outer shell of the main body tool, and hand-rotates the end cap tool or the main body tool, or both. During hand-rotation, the insert remains non-rotatable with respect to the outer shell until a torque exerted by hand rotation exceeds a predetermined torque limit. When the predetermined torque is exceeded, a torque limiter allows the insert to rotate relative to the outer shell to prevent further tightening of the screw-on end cap. The torque limiter is positioned within the hollow interior of the outer shell and coupled to the insert.

The Inventor solved the problem of overtightening the screw-on end cap of the PV electrical connector in several ways. First, the Inventor developed a main body tool, an example of which was described in the preceding paragraph, which includes torque limiting within its hand gripped outer shell. Second, the Inventor developed a main body tool and end cap tool that may be handleless, and structured to be hand gripped around their outside perimeter surfaces to improve tactile sensation. This can help prevent overtightening even without the torque limiter assembly. Improved tactile sensation gives the installer better tactile cues about the tightness of the screw-on end cap. In addition, a hand grippable and handleless main body tool and end cap tool, help to reduce awkwardness when working in tight spaces under PV panels. Instead of relying on an external handle or portion to provide torque limiting, the torque limiting mechanism is within the outer shell of the main body. This allows for a hand-gripped and hand-turned device that provides torque limiting.

The Inventor solved the problem of end-cap sizing compatibility between PV electrical connector types, by providing an end cap tool that is structured to accept and hold a screw-on end cap of first size on one end, and of a second size on the other end. The second size and the first size are different from one another. As an example, a first end cap socket on a first end of the end cap body, may be sized to accept the screw-on end cap, such as an MC4-type PV electrical connector. The second end cap socket on a second end of the end cap body may be sized to accept a non-MC4-type PV electrical connector, such as an H4-type PV electrical connector.

The Inventor solved the problem of tool misplacement, by providing a magnetic latching mechanism that allows the main body tool and end cap tool to be stored and transported together as one unit. An end cap socket coupler and an alignment-key, which extend from a closed end of the outer shell of the main body tool, may be received by the end cap socket and lengthwise slot within the end cap tool. The alignment-key orients the main body tool so that magnets within the main body tool align with magnets within the end cap tool. This arrangement allows the main body tool and end cap tool to be made from non-magnetic material, such as aluminum, brass, non-magnetic stainless steel, or plastic, because the magnets are aligned end-to-end.

This Summary includes a select set of features and advantages of the electrical connector installation tool. Some of these features may be optional. The examples in this Summary are a sampling of what is possible and do not limit the claims.

BRIEF DESCRIPTION OF DRAWINGS

FIG. 21 is a section view taken along section lines 21-21 in FIG. 20.

FIG. 32 illustrates, by flow chart, a simplified example of the assembly sequence represented in FIGS. 26-28 and also in FIGS. 29-31.

FIG. 36 illustrates, in right perspective view, the end cap tool of FIG. 20, with magnets exploded away from the end cap body.

FIG. 37 illustrates, in right end view, the main body tool of FIG. 8, where magnets within the main body tool are shown hidden from view and represented by dashed lines.

FIG. 38 illustrates a partial cutaway view of the main body tool and end cap tool secured together by magnets; magnets within the main body are illustrated using dashed lines to represent that they are hidden from view.

DETAILED DESCRIPTION

Figures 1, 2, 3:
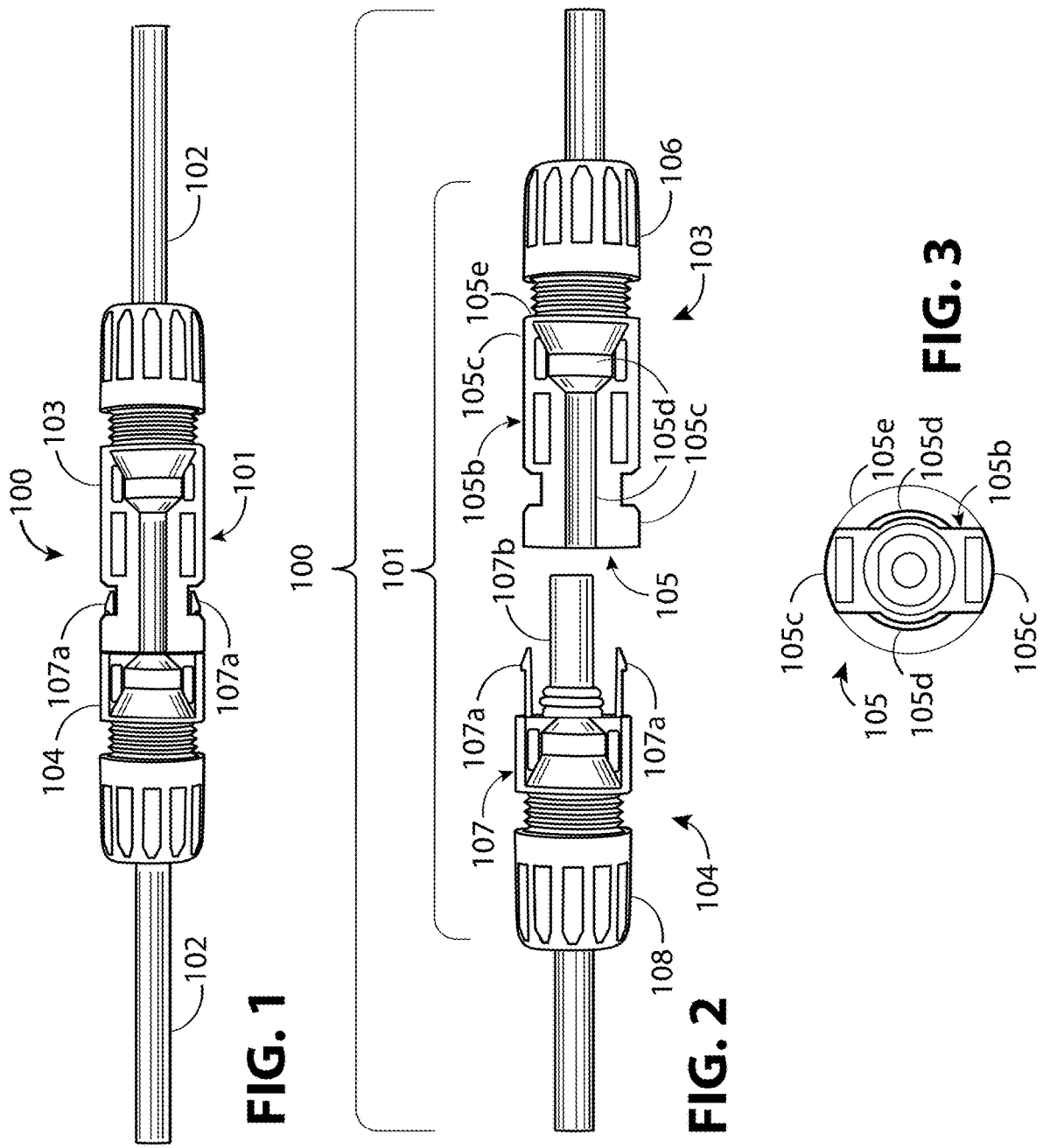
FIGS. 1, 2, and 3 illustrate, with FIGS. 1 and 2 shown in front view, and FIG. 3 in end view, a PV electrical connector assembly using MC4-type PV electrical connectors, and with FIG. 2 showing a portion of FIG. 1 with the male PV electrical connector and female PV electrical connector disconnected.

The Detailed Description and Claims may use ordinals such as "first," "second," or "third," to differentiate between similarly named parts. These ordinals do not imply order, preference, or importance. This disclosure uses "optional" to describe features or structures that are optional. Not using the word "optional" does not imply a feature or structure is not optional. In this disclosure, "or" is an "inclusive or," unless one of the following occurs: (1) the "or" is preceded by a qualifier, such as "either," which signals an "exclusive or" (2) interpreting the "or" as an "inclusive or" would not make logical sense. In that case it would be interpreted as an "exclusive or."

As used throughout this disclosure, "comprise," "comprising," "include," "including," "have," "having," "contain," "containing" or "with" are open-ended and do not exclude unrecited elements.

"Left," "right," and "front," are relative terms and generally refer to the relative position between features to help orient the reader.

The Detailed Description includes the following sections: "Definitions," "Overview," "General Discussion," "Assembly Example," and "Conclusion and Variations."

Definitions

Tube: As defined in this disclosure, a tube is a hollow section with a length and two ends. The tube may be cylindrical or non-cylindrical. For example, a tube may include a circular cross section (i.e., a cylindrical tube), an elliptical cross section, a rectangular cross section, a hexagonal cross section, a pentagonal cross section or may have a cross section of other closed polygons, curved, or combination of piece-wise curved and polygonal shapes. A slotted tube refers to a tube with a slot or slot-shaped opening that extends along the body of the tube and through both ends of the tube.

PV electrical connector: As defined in this disclosure, a PV electrical connector is a pair of male and female subconnectors that are designed to connect together wires between PV panels together and are capable of handling voltages and currents typically found in PV panel installations.

MC4-type PV electrical connectors: As defined in this disclosure, an MC4-type PV electrical connector is a PV electrical connector whose screw-on end cap may be received and turned by an end cap socket of the present disclosure that is designed to receive and turn an end cap of an MC4 PV electrical connector. In addition, an MC4-type PV electrical connector includes a main body that may be received and turned by a main body tool of the present disclosure that is designed to receive and turn the main body of an MC4 PV electrical connector.

H4-type PV electrical connectors: As defined in this disclosure, an H4-type PV electrical connector is a PV electrical connector whose screw-on end cap may be received and turned by an end cap socket of the present disclosure that is designed to receive and turn an end cap of an H4 PV electrical connector. In addition, an H4-type PV electrical connector includes a main body that may be received and turned by a main body tool of the present disclosure that is designed to receive and turn the main body of an H4-type PV electrical connector.

Overview

PV electrical cable connectors used in photovoltaic systems include a male electrical connector that electrically engages a female electrical connector. These PV electrical connectors are used to connect PV panels together. They are generally used in outdoor environments where they may potentially be exposed to wind, rain, or snow. They may carry DC voltages of 600 V in residential installations and 1000 V in a commercial installation. They may carry DC current of 30 A. Because of this, PV electrical connectors are typically required to meeting local or state building codes and have regulatory approval. Examples of applicable regulatory standards include UL-6703 and IEC-62852. Examples of applicable waterproofing regulatory standards are IP67 and IP68.

Figures 6, 7:
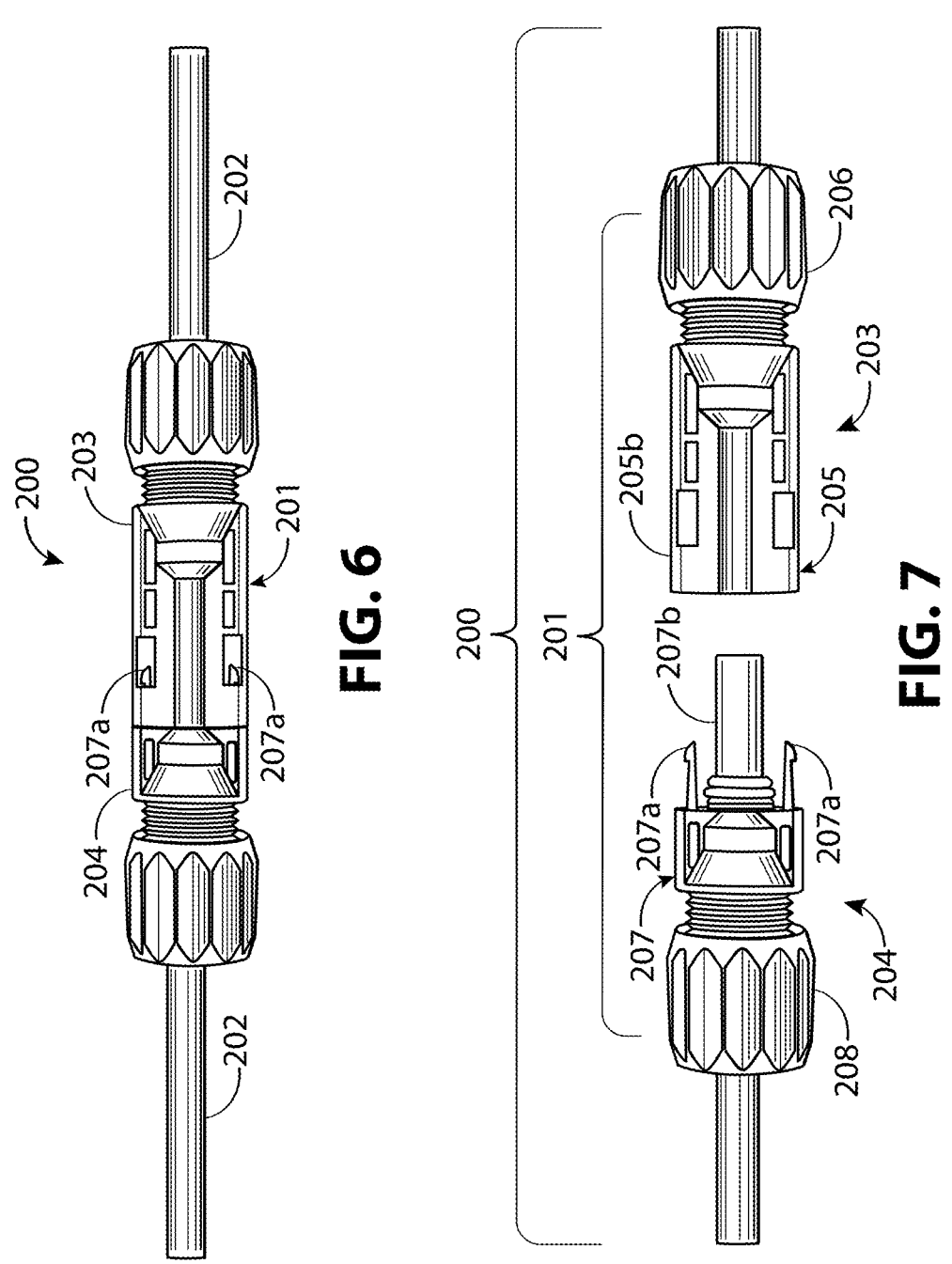
FIGS. 6 and 7 illustrate, in front view, a PV electrical connector assembly using H4-type PV electrical connectors, with FIG. 7 showing a portion of FIG. 6 with the plug and socket disconnected.

PV electrical connectors are available in several different types, for example: MC4-type, H4-type, or T4-type PV electrical connectors. FIGS. 1-3, 6, and 7 show two examples of PV electrical connector cable assemblies. FIGS. 1 and 2 show a PV electrical connector cable assembly 100 that utilizes MC4-type PV electrical connectors. FIG. 3 shows an end view of the main body 105 of the male MC4-type PV electrical connector of FIG. 2. FIGS. 6 and 7 show an example of a PV electrical connector cable assembly 200 and PV electrical connector assembly 201 that utilizes non-MC4-type PV electrical connectors.

FIG. 1 shows an example of a PV electrical connector cable assembly 100 with a PV electrical connector assembly 101 and electrical wire 102. The PV electrical connector assembly 101 includes a male MC4-type PV electrical connector 103 and a female MC4-type PV electrical connector 104 connected together, using a pair of locking tabs 107a, to form a watertight seal.

FIG. 2 illustrates a portion of the PV electrical connector cable assembly 100 and the PV electrical connector assembly 101 of FIG. 1, with the male MC4-type PV electrical connector 103 and the female MC4-type PV electrical connector 104 disconnected from one another. Referring to FIG. 2, the male MC4-type PV electrical connector 103 includes a main body 105 and a screw-on end cap 106 that is threadedly fastenable to the main body 105. The female MC4-type PV electrical connector 104 includes a main body 107 with the pair of locking tabs 107a extending from the main body 107, and a screw-on end cap 108 that is threadedly fastenable to the main body 107. The male MC4-type PV electrical connector 103 is so-called because it includes an electrical contact pin in the form of a male electrical contact pin. Likewise, the female MC4-type PV electrical connector 104 includes an electrical contact pin in the form of a female socket pin. The electrical contact pins are hidden from view beneath the shrouds in FIGS. 1 and 2. Installers typically use specialized hand tools, such as a MC4-type connector wrench or an H4-type PV electrical connector wrench, to install the screw-on end caps to their respective male and female main bodies.

Referring to FIGS. 2 and 3, the main body 105 includes a shroud 105b. The shroud 105b surrounds the electrical contact pin. The shroud 105b may be a substantially rectangular prism with arc-shaped sides 105c, arc-shaped ribs 105d, and with various indents, and apertures. The arc-shaped sides follow the arc of the substantially circular base 105e. The arc-shaped ribs 105d project out of a substantially planar surface of the shroud 105b in order to accommodate the electrical contact pin, electrical wire, and other internal parts of the male MC4-type PV electrical connector 103.

Figure 4:
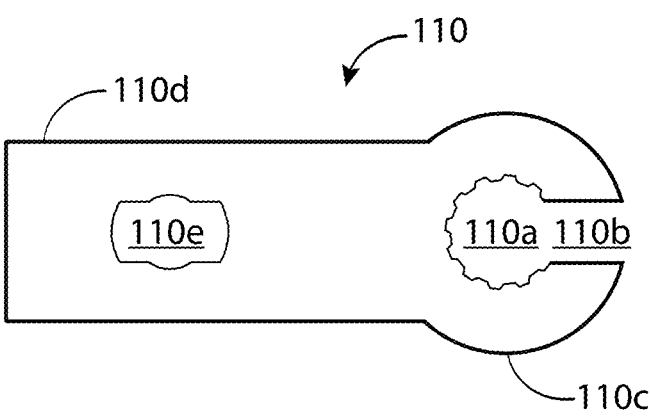
FIG. 4 shows an MC4-type connector wrench, embodying principles from the prior art.

FIG. 4 shows an MC4-type connector wrench 110, embodying principles from the prior art. The MC4-type connector wrench 110 includes a toothed aperture 110a that is sized and shaped to engage an MC4-type screw-on end cap, such as the screw-on end cap 106 or screw-on end cap 108 of FIG. 2. A slot 110b extends from the outside 110c of the MC4-type connector wrench 110 into the toothed aperture 110a. The MC4-type connector wrench 110 includes an arm 110d that extends radially away from the toothed aperture 110a. The arm 110d includes a notched hole 110e that is sized and shaped to engage the main body 105 of the male MC4-type PV electrical connector 103 or female MC4-type PV electrical connector 104 from FIG. 2.

Figure 5:
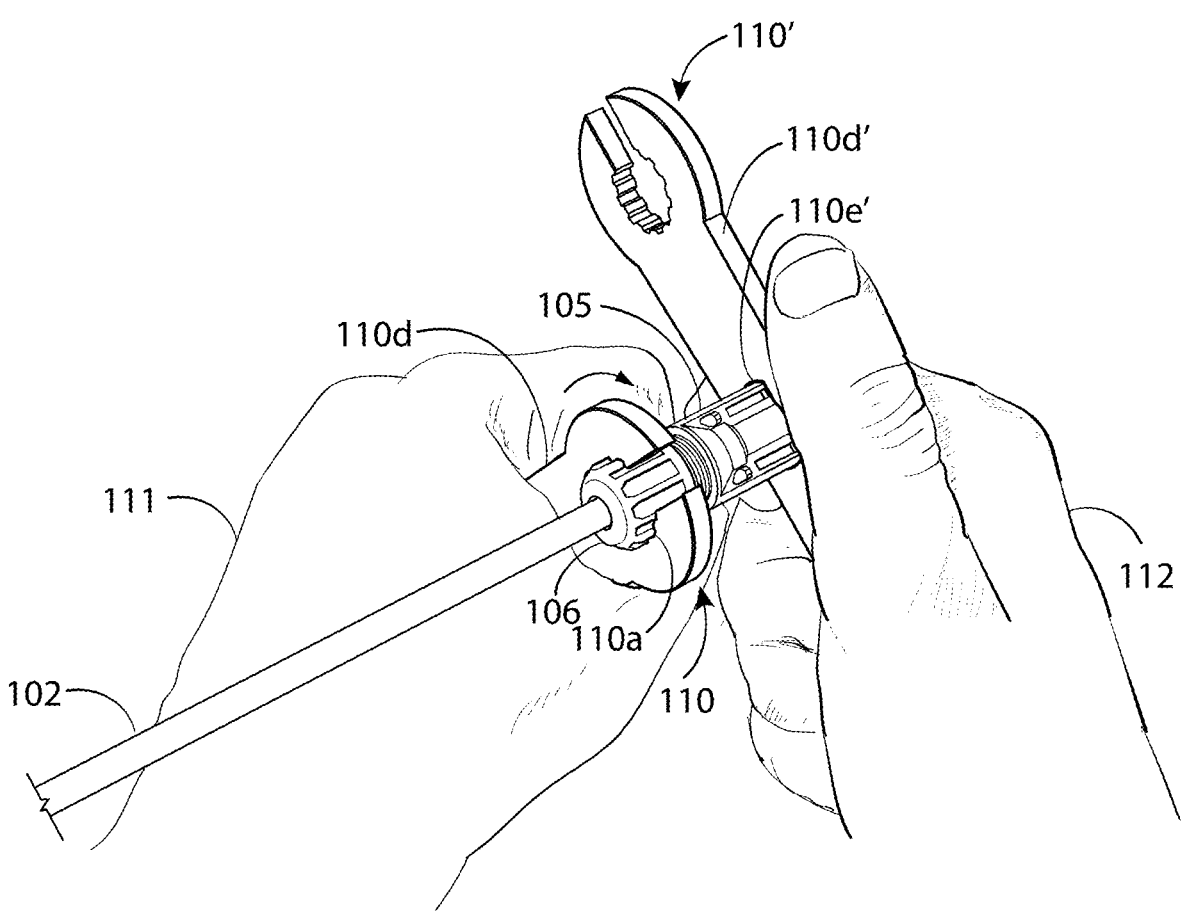
FIG. 5, illustrates in perspective view, an installer using two instances of the MC4-type connector wrench of FIG. 4, to secure the screw-on end cap to the main body of an MC4-type PV electrical connector of FIG. 1.

FIG. 5 illustrates how an installer would tighten the screw-on end cap 106 to the main body 105. FIG. 5 shows the installer engaging the screw-on end cap 106 with the toothed aperture 110a of a first instance of the MC4-type connector wrench 110. The installer uses the notched hole 110e' of a second instance of the MC4-type connector wrench 110' to engage and hold the main body 105. The installer grasps and rotates the arm 110d of a first instance of the MC4-type connector wrench 110 with one hand 111 to tighten the screw-on end cap 106. At the same time, the installer grasps and holds the arm 110d' of the second instance of the MC4-type connector wrench 110' to prevent the main body 105 from moving as they tighten the screw with the other hand 112.

FIG. 6 shows another example of a PV electrical connector cable assembly 200, which utilizes non-MC4-type PV electrical connectors. The PV electrical connector cable assembly 200 includes a PV electrical connector assembly 201 and electrical wire 202. The PV electrical connector assembly 201 includes a male PV electrical connector illustrated as a male H4-type PV electrical connector 203, and a female PV electrical connector illustrated as female H4-type PV electrical connector 204, connected together to form a watertight seal using a pair of locking tabs 207a.

Referring to FIG. 7, the male H4-type PV electrical connector 203 includes a main body 205 and a screw-on end cap 206 that is threadedly fastenable to the main body 205. The female H4-type PV electrical connector 204 includes a main body 207 with the pair of locking tabs 207a and a screw-on end cap 208. The screw-on end cap 208 is threadedly fastenable to the main body 207. The pair of locking tabs 207a extend from the main body 207 of the female H4-type PV electrical connector 204 toward the main body 205 of the male H4-type PV electrical connector 203. The main body 207 includes a shroud 207*b* that is received by the shroud 205*b* of the main body 205.

The screw-on end caps of FIGS. 2 and 7 may provide a watertight seal. However, the size and grip pattern are different. Comparing the screw-on end cap 106 of FIG. 2 to screw-on end cap 206 of FIG. 7, screw-on end cap 206 is larger and has a more pronounced groove pattern on its outer surface. Similarly, screw-on end cap 208 of FIG. 7 is larger and has a more pronounced groove pattern on its outer surface than screw-on end cap 108 of FIG. 2.

The Inventor identified the following problems related to installing PV electrical connectors during PV system installation. The Inventor observed that installers may overtighten and damage screw-on end caps or main bodies of PV electrical connectors during installation using conventional tools like the one shown in FIGS. 4 and 5. The Inventor observed that holding a conventional PV electrical connector wrench by a handle, such as MC4-type connector wrench 110 and arm 110*d*, does not provide sufficient tactile feedback to prevent overtightening. This can be exacerbated by the moment arm of the wrench's handle, that can provide too much torque.

The Inventor also observed that using these tools can be awkward and could damage the electrical wire. For example, in FIG. 5, holding the MC4-type connector wrench 110 and MC4-type connector wrench 110' requires two hands, as illustrated. An installer may find it difficult to hold the MC4-type connector wrench 110 and the MC4-type connector wrench 110' at a perpendicular angle to the electrical wire 102 and maintain pressure on the electrical wire 102 to prevent it from moving, twisting, or pulling loose. Excess movement or twisting of the electrical wire 102 can damage the electrical wire 102, damage the electrical contact pin within the main body 105, or pull the wire loose from the electrical contact pin. The other end of the electrical wire may be connected and secured. In that instance, excessive twisting or movement of the electrical wire 102 may also damage or pull the electrical wire 102 away from an electrical contact pin at the other end of the electrical wire 102. These problems can be made worse by low clearance between the installed PV panels and the roof, which makes it difficult to manipulate handled tools.

The MC4-type connector wrench 110 of FIGS. 4 and 5 is not compatible with many non-MC4-type PV electrical connectors, such as the male H4-type PV electrical connector 203 and the female H4-type PV electrical connector 204 in FIG. 7. The male H4-type PV electrical connector 203 and the female H4-type PV electrical connector 204 of FIG. 7 require a different tool securing their screw-on end caps than the male MC4-type PV electrical connector 103 and female MC4-type PV electrical connector 104 of FIGS. 1 and 2.

In addition, the Inventor observed that installers may misplace the installation tools, which can be inconvenient, especially when the installation is on a roof and spare tools are on the ground. The Inventor observed that this problem may be exacerbated by having to use multiple tools for different types of PV electrical connectors. For example, one jobsite may require using H4-type PV electrical connectors. Another jobsite may require MC4-type PV electrical connectors. This creates an additional burden for the installer to have the correct tool on both the roof and on the jobsite.

The Inventor developed a PV electrical connector installation tool that solves the above-mentioned problems. An example of the PV electrical connector installation tool of the present disclosure is illustrated in FIGS. 8-25. The PV electrical connector installation tool may include two subtools, a main body tool 120 (FIGS. 8-10, 12, 14-16) and an end cap tool 130 (FIGS. 20-25) that is separate from the main body tool 120. Referring to FIGS. 8-16, the main body tool 120 is structured to engage the main body and shroud of a PV electrical connector. Referring to FIGS. 20-25, the end cap tool 130 is structured to hold and turn the screw-on end cap of a PV electrical connector.

Figures 10, 11:
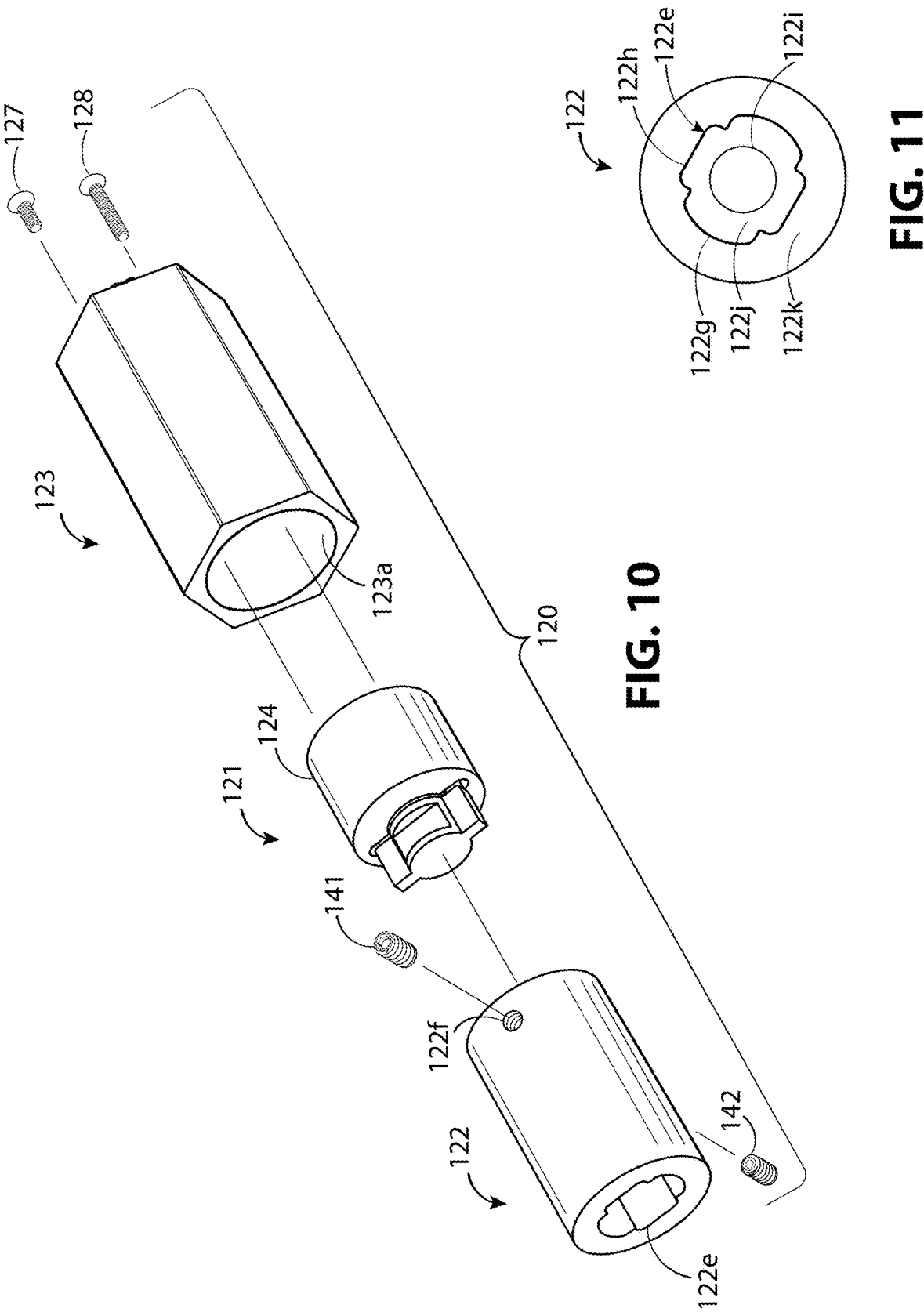
FIGS. 10, 11, 12, and 13, illustrate left exploded perspective view of the main body tool, left end view of the cylindrical insert within the main body tool, right exploded perspective view of the main body tool, and right end view of cylindrical insert within the main body tool, respectively.
Figures 12, 13:
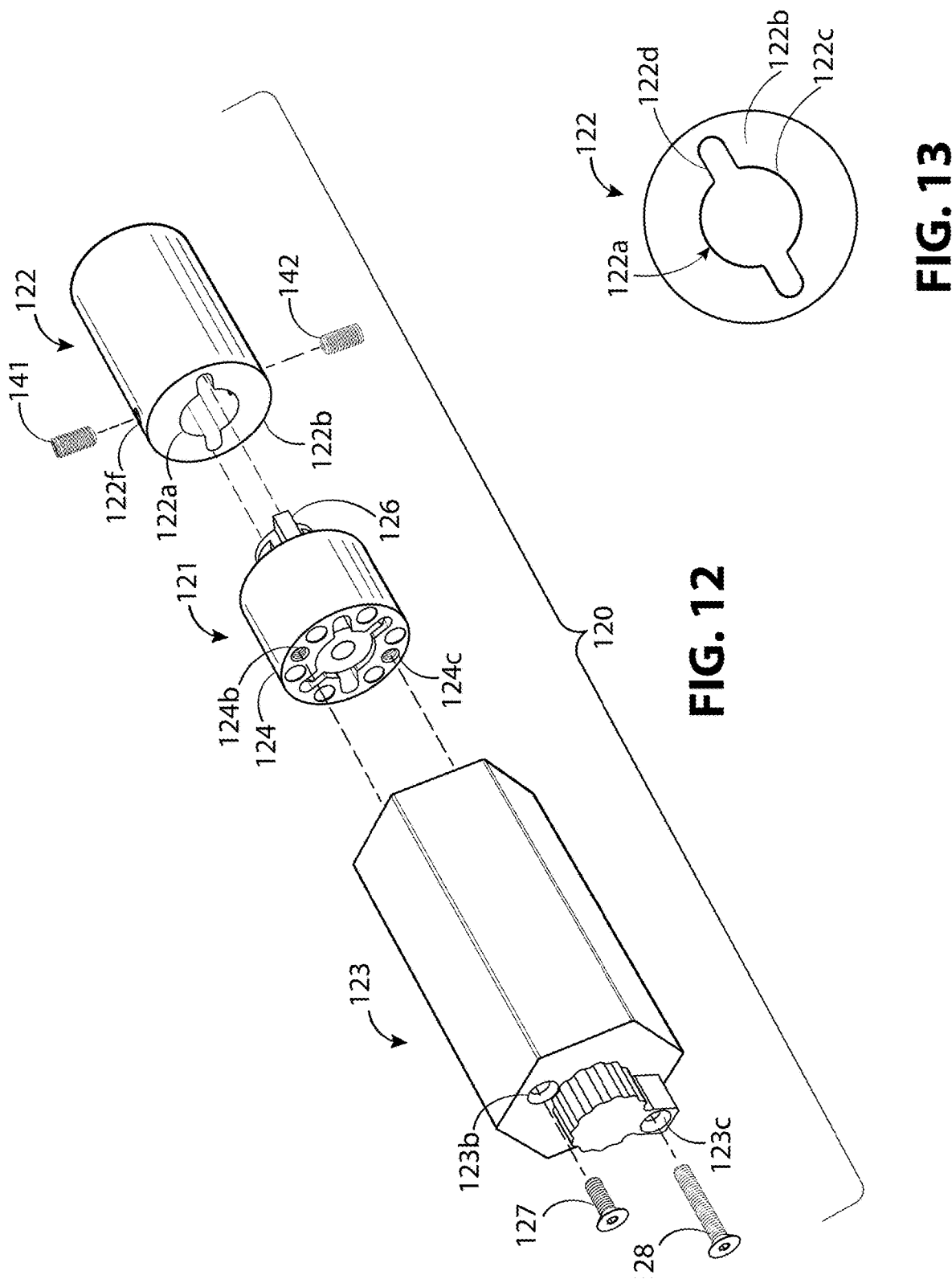
Figure 28:
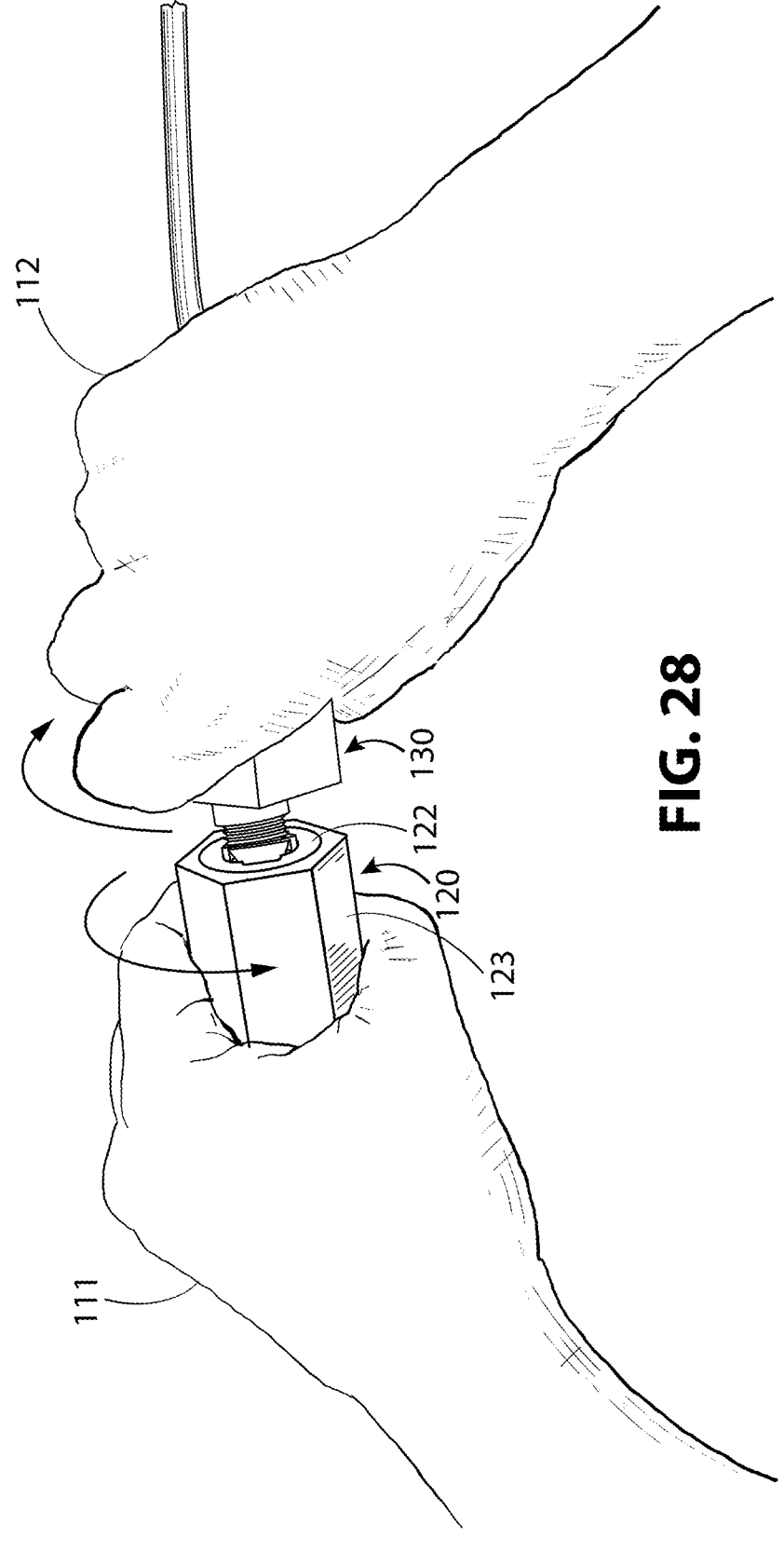
Figure 31:
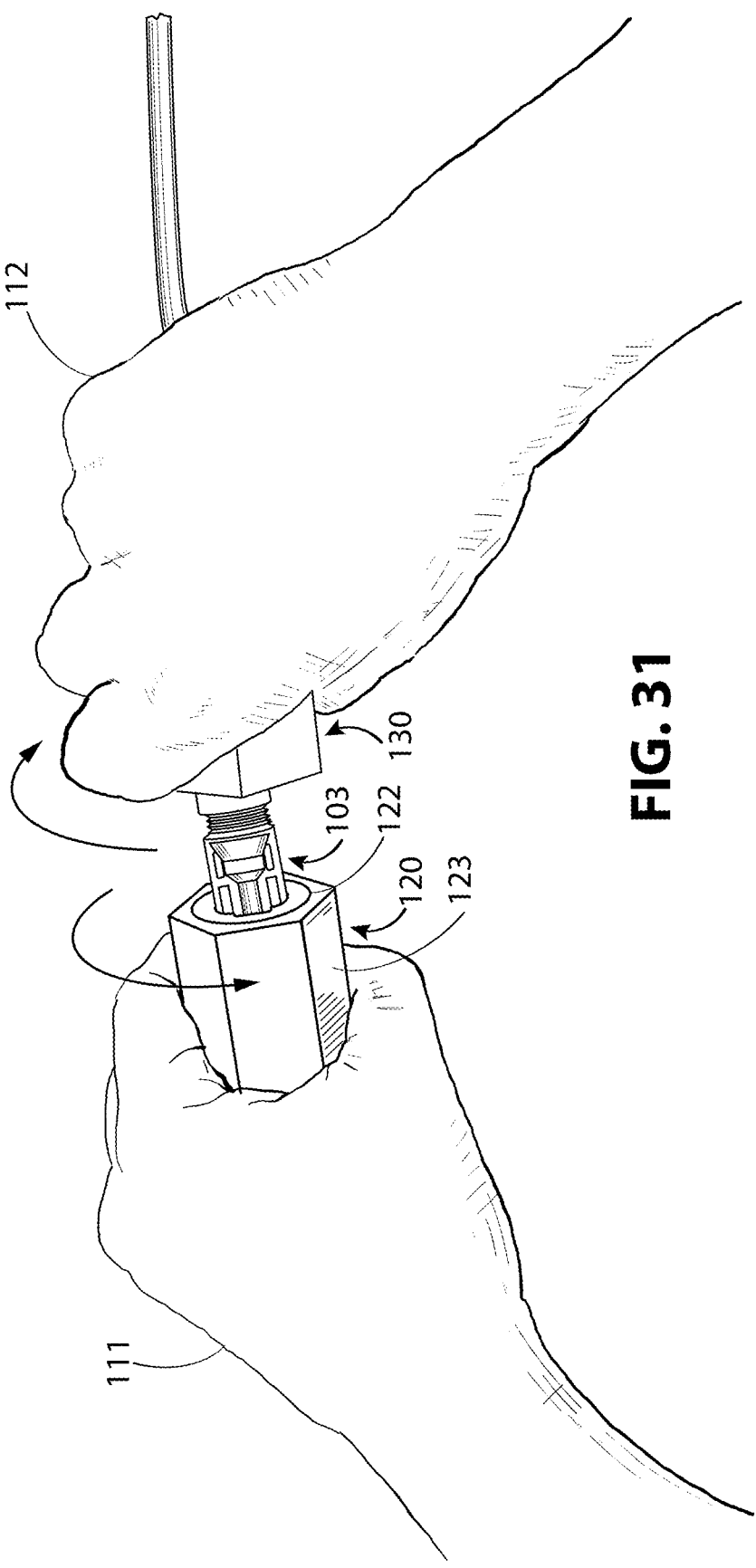

The Inventor solved the problem of overtightening the screw-on end cap of the PV electrical connector in several ways. Referring to FIGS. 10 and 12, a torque limiter assembly 121 within the main body tool 120 can limit the torque caused by hand-rotation to not exceed a predetermined value, thus preventing overtightening. Torque limiter assembly 121 rotationally engages a cylindrical insert 122. Referring to FIG. 10, the torque limiter assembly 121 and cylindrical insert 122 may reside within a hollow interior 123*a* of the outer shell 123. Referring to FIGS. 10 and 12, the torque limiter prevents rotation of the cylindrical insert 122 relative to the outer shell 123 until a predetermined torque limit is exceeded. The torque is caused by hand-rotation of the main body tool 120 or the end cap tool. Once the predetermined torque limit is exceeded, the cylindrical insert 122 will rotate within the outer shell 123. Because the installer is gripping the outer shell 123, turning either the outer shell 123 or the end cap tool has no effect on the screw-on end cap that is coupled to the cylindrical insert 122. This prevents overtightening of the screw-on end cap, and thus prevents damage to the screw-on end cap, wire, or main body of the PV electrical connector. Referring to FIGS. 28 and 31, the main body tool 120 and end cap tool 130 may be handleless and structured to be hand-gripped or hand-grasped around their outside perimeter surfaces to improve tactile sensation. This can help prevent overtightening even without the torque limiter assembly 121 of FIG. 10. In addition, a hand-grippable and handleless main body tool and end cap tool, help to reduce awkwardness when working in tight spaces under PV panels. Referring to FIG. 10, the structural combination of the cylindrical insert 122 and torque limiter assembly 121 positioned within the outer shell 123, allows the main body tool 120 to provide torque limiting while being hand-gripped and hand-tightened.

Figure 24:
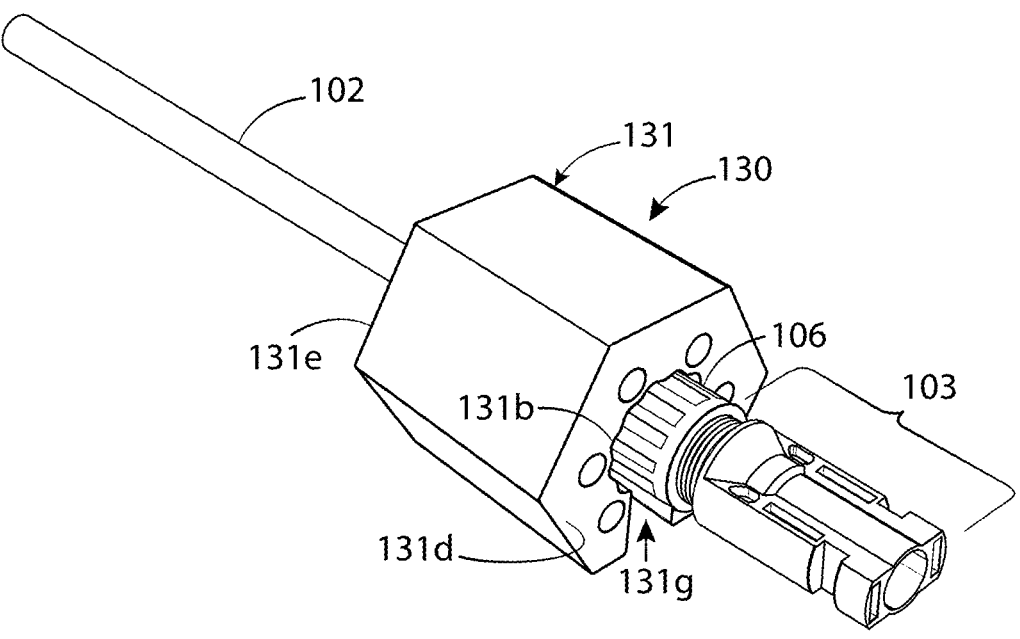
FIGS. 24 and 25 illustrate, in perspective view, the end cap tool of FIG. 20 engaging an MC4-type and H4-type PV electrical connector screw-on end cap, respectively.
Figure 25:
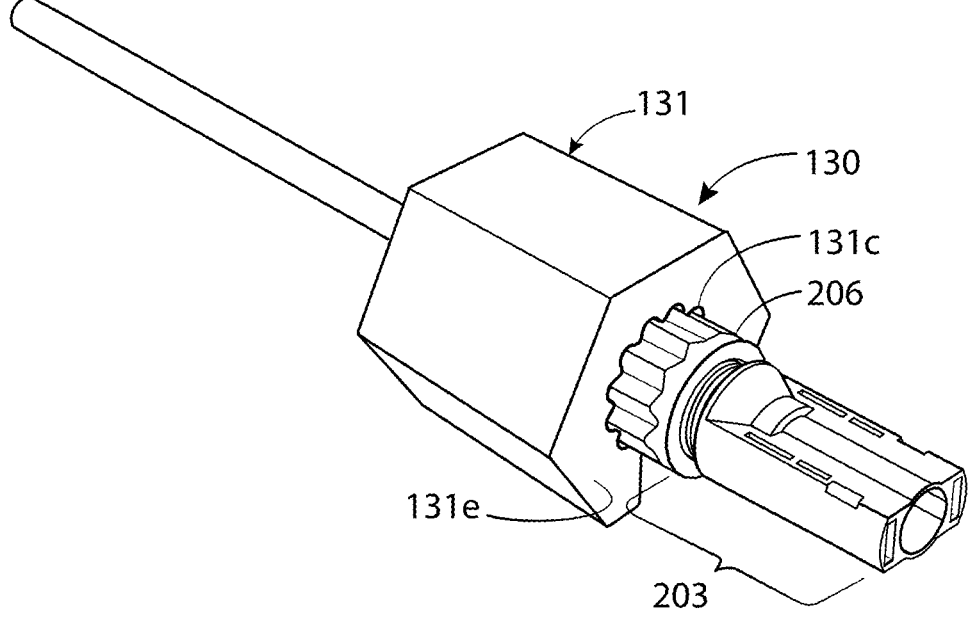

The Inventor solved the problem of end-cap sizing compatibility between PV electrical connector types by providing an end cap tool that is structured to accept and hold a screw-on end cap of first size on a first end of end cap tool and a second size, different from the first size, on a second end of the end cap tool. As an example, FIG. 24 illustrates a first end cap socket 131*b* on a first end 131*d* of the end cap tool body 131 that may be sized to accept a screw-on end cap 106 of MC4-type PV electrical connector. In FIG. 24, the PV electrical connector is a male MC4-type PV electrical connector 103. FIG. 25 illustrates a second end cap socket 131*c* on a second end 131*e* of the end cap tool body 131 that may be sized to accept a non-MC4-type PV electrical connector. In FIG. 25, the PV electrical connector assembly is illustrated as a male H4-type PV electrical connector 203 and the screw-on end cap 206 of an H4-type PV electrical connector.

The Inventor solved the problem of tool misplacement by providing a magnetic latching mechanism. This will be described for FIGS. 33-38.

General Discussion

This General Discussion section will discuss the main body tool 120 of FIGS. 8-16 and the end cap tool 130 of FIGS. 20-25 in more detail.

Figures 17, 18, 19:
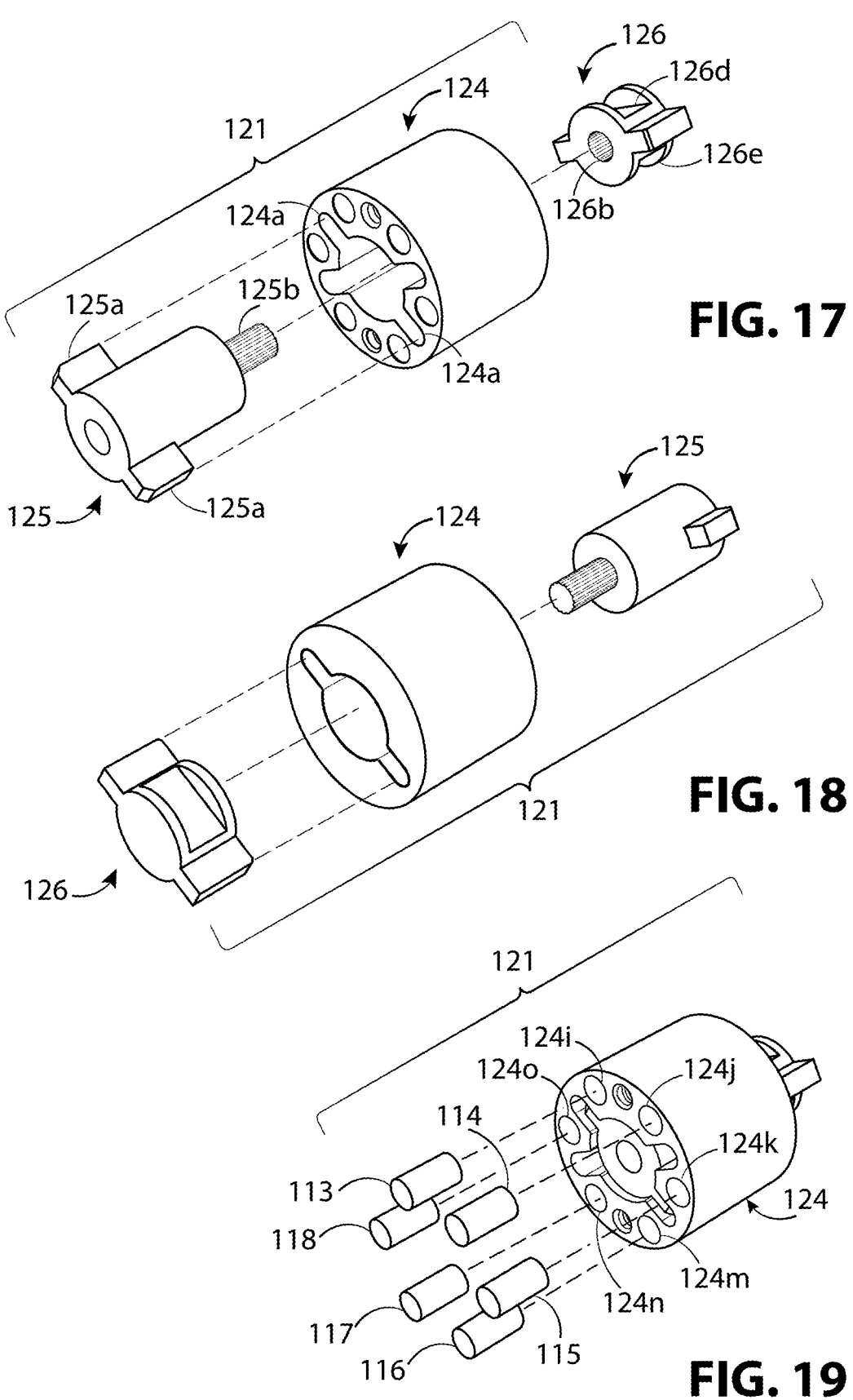
FIGS. 17 and 18 illustrate right and left exploded perspective views, respectively, the torque limiter assembly illustrated in FIGS. 10 and 12.
FIG. 19 illustrates the torque limiter assembly of FIGS. 10 and 12, with magnets shown exploded away from rest of the torque limiter assembly.

The following is an example of how the torque limiter engages the cylindrical insert. FIGS. 17-19 illustrate an example of a torque limiter assembly suitable for use within the outer shell 123 of the main body tool 120 of FIG. 8. Referring to FIGS. 17 and 18, the torque limiter assembly 121 may include a cylindrical sleeve 124, a torque limiter 125, and a drive coupler 126. The torque limiter 125 may be received within the cylindrical sleeve 124 and both may be structured to prevent rotation of the torque limiter 125 within the cylindrical sleeve 124. As an example, referring to FIG. 17, fins 125*a* projecting out from the torque limiter 125 may be received within a blind slot 124*a* within the cylindrical sleeve 124. The drive coupler 126 may be rotationally coupled to the torque limiter 125 via a shaft 125*b*. The shaft 125*b* projects out of, and is rotationally coupled to, the torque limiter 125. The shaft 125*b* engages an aperture 126*b* within the drive coupler 126.

The torque limiter 125 and drive coupler 126 depicted in FIGS. 17 and 18 were manufactured by Tokyo Ohka Kogyo (TOK) America Inc. Other torque limiters that perform the equivalent torque limiting function described may also be used.

Referring to FIG. 12, the drive coupler 126 is received by a second aperture 122*a* in a second end 122*b* of the cylindrical insert 122. The second aperture 122*a* is sized and shaped to receive and hold the drive coupler 126 and to prevent rotational movement of the cylindrical insert 122 independent of the drive coupler 126. For example, in FIG. 13, the second aperture 122*a* may include a cylindrical center portion 122*c* and a slotted aperture 122*d* running through the second end 122*b* of the cylindrical insert 122. Referring to FIGS. 11 and 13, the cylindrical center portion 122*c* (FIG. 13) and second end 122*b* (FIG. 13) may be blind holes to allow room for a main body socket 122*e* (FIG. 11) on the first end 122*k* (FIG. 11) of the cylindrical insert 122 (FIG. 11).

Figures 14, 15, 16:
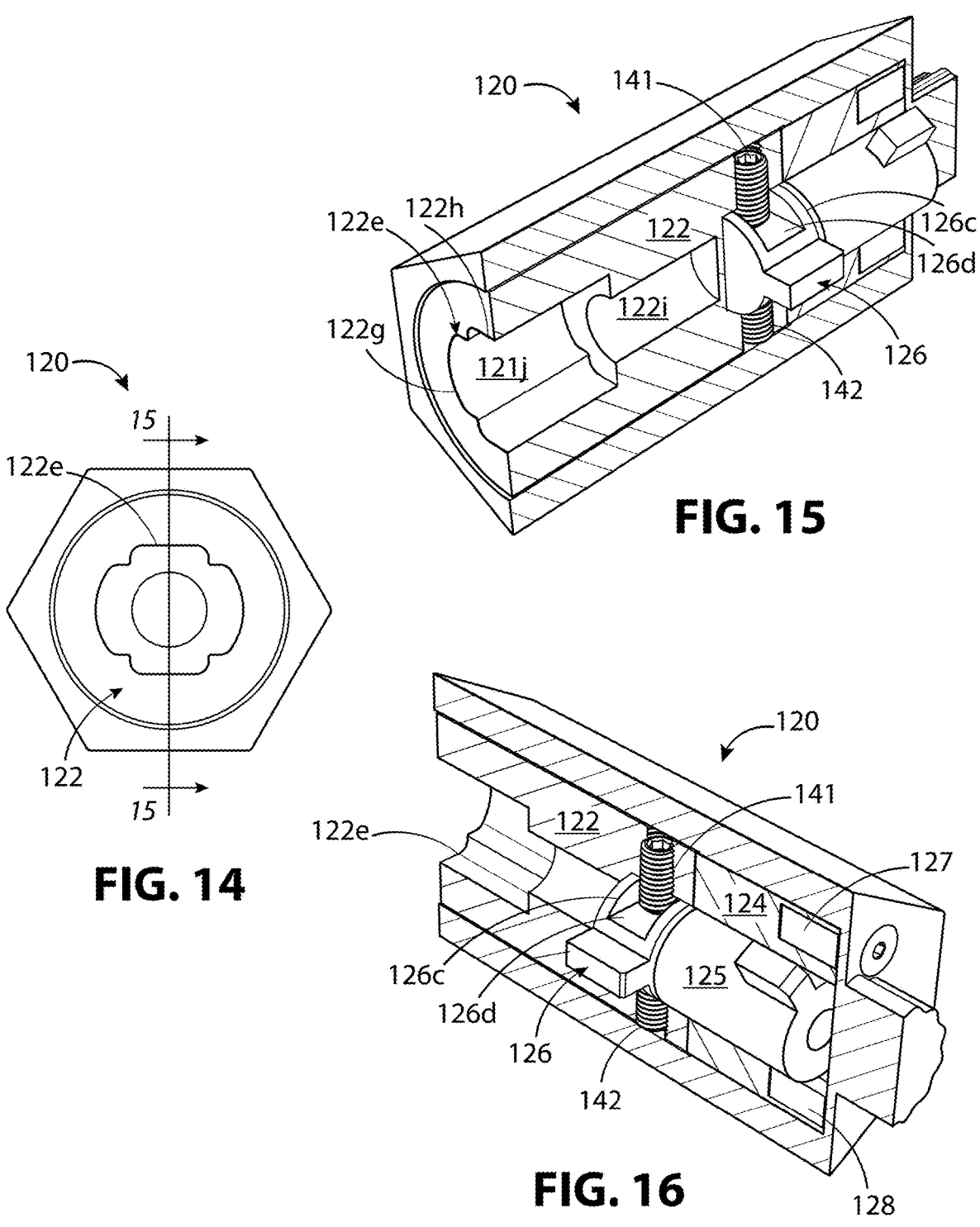
FIGS. 14, 15, and 16, illustrate a left end view, a left perspective section view, and right perspective section view, respectively, with the sections for FIGS. 15 and 16 taken along section lines 15-15 in FIG. 14.

FIGS. 8, 10, 11, 14, 15, and 16, illustrate a main body socket 122*e* of the cylindrical insert 122 that may be sized, shaped, and structured to receive the shroud of the main body of a PV electrical connector. Referring to FIGS. 10 and 12, the torque limiter assembly 121 may be secured with the hollow interior 123*a* (FIG. 10) of the outer shell 123, so that the cylindrical sleeve 124 does not move or rotate within the outer shell 123. For example, the torque limiter assembly 121 may be secured to the outer shell 123 using threaded fasteners 127, 128. Referring to FIG. 12, the threaded fasteners 127, 128 may extend through apertures 123*b*, 123*c*, and be secured by threaded apertures 124*b*, 124*c*, respectively. FIG. 16 also illustrates, in partial cutaway view, threaded fasteners 127, 128 threadedly engaging the cylindrical sleeve 124 of the torque limiter assembly 121 of FIGS. 10 and 12.

Referring to FIGS. 15 and 16, the drive coupler 126 may be further secured to the cylindrical insert 122 to prevent linear movement. The drive coupler 126 may be secured to the cylindrical insert 122 by threaded fastener 141 and threaded fastener 142. These threaded fasteners engage grooves in the outside surface 126*c* of the drive coupler 126. For example, FIGS. 15-17 shows groove 126*d*, and FIG. 17 shows groove 126*e*. Referring to FIGS. 10 and 12, threaded fastener 141 and threaded fastener 142, depicted here as set screws, may extend through threaded apertures in the cylindrical insert 122. FIGS. 10 and 12 illustrate a threaded aperture 122*f* that receives threaded fastener 141. The other threaded aperture in the cylindrical insert 122 that receives threaded fastener 142 is hidden from view.

Referring to FIG. 16, when torque exerted by hand-rotation on the torque limiter 125 is below a predetermined torque limit, the shaft of the torque limiter 125 does not rotate. However, when that predetermined torque limit is exceeded, the shaft of the torque limiter 125 rotates. Because the cylindrical insert 122 is rotationally coupled to the shaft of the torque limiter 125 via the drive coupler 126, the torque limiter 125 controls and restricts the rotational movement of the cylindrical insert 122.

Referring to FIG. 11, the main body socket 122*e* includes a first slot 122*g* with two opposing arced ends. The first slot 122*g* is sized and shaped to receive the shroud and a portion of the main body of a PV electrical connector. For example, the first slot 122*g* may be sized and shaped to receive both an MC4-type PV electrical connector and an H4-type PV electrical connector. The size and shape of the slot reduces movement of the PV electrical connector within the slot. The two opposing arcs of the first slot 122*g* may form opposite sections of a substantially circular arc and be sized to accommodate a shroud of a PV electrical connector. For example, the two opposing arcs of the first slot 122*g* may be sized and shaped to receive and hold the arc-shaped sides 105*c* of shroud 105*b* of FIGS. 2 and 3. Continuing to refer to FIG. 11, the two opposing arcs of the first slot 122*g* are also sized to accommodate the circular arc of other PV electrical connectors, such the arc-shaped sides of the shroud 205*b* of FIG. 7 since the shrouds of both connectors are of similar size. Continuing to refer to FIG. 11, a second slot 122*h* extends perpendicularly across the first slot and is sized and shaped to accommodate any projections that extend beyond side surfaces of the PV electrical connector. As an example, the second slot 122*h* can accommodate the arc-shaped ribs 105*d* of FIGS. 2 and 3 as well as the arc-shaped ribs of the H4-type PV electrical connectors of FIGS. 6 and 7. Continuing to refer to FIG. 11, the first slot 122*g* and the second slot 122*h* are sized and shaped to accept both male and female PV electrical connectors. Referring to FIGS. 11 and 15, a blind aperture 122*i* may extend into the cylindrical insert 122 from the bottom of the cavity 122*j* created by the first slot 122*g* and the second slot 122*h*. The blind aperture 122*i* may be sized and shaped to receive the shroud surrounding the electrical contact pin (in this case, a socket pin) of the female PV electrical connector; for example, the shroud 107*b* of FIG. 2 and the shroud 207*b* of FIG. 7. Continuing to refer to FIGS. 11 and 15, the first slot 122*g* may be sized and shaped to receive the pair of locking tabs of a female PV electrical connector; for example, shroud 107*b* of FIG. 2 and shroud 207*b* of FIG. 7.

Figure 20:
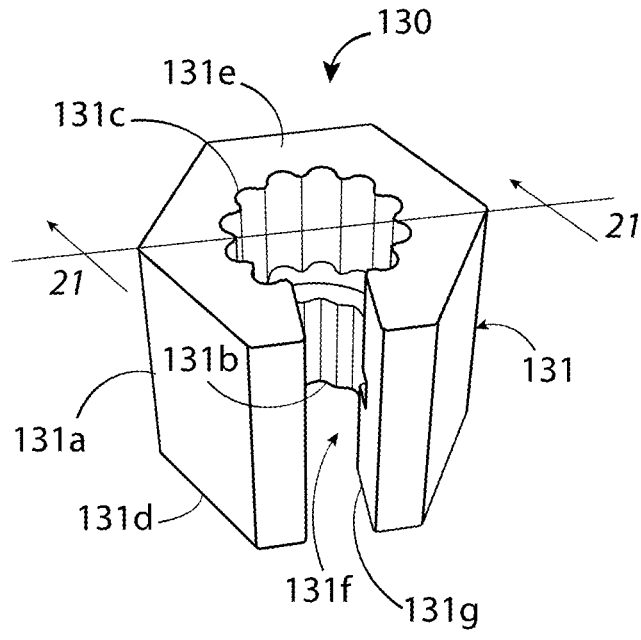
FIGS. 20 and 21 illustrate, in front perspective view, an example of an end cap tool in accordance with the present disclosure, where
Figure 21:
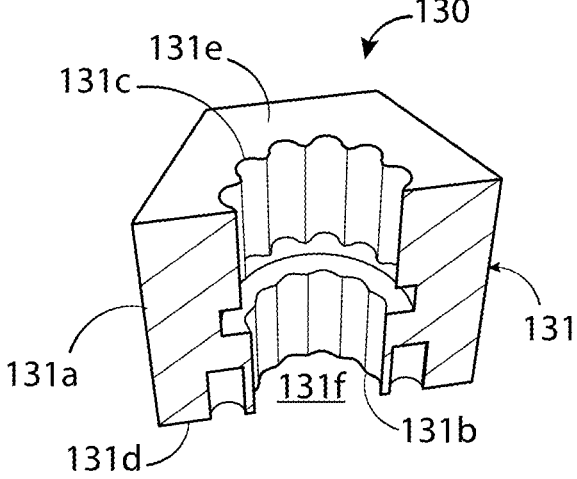
Figure 22:
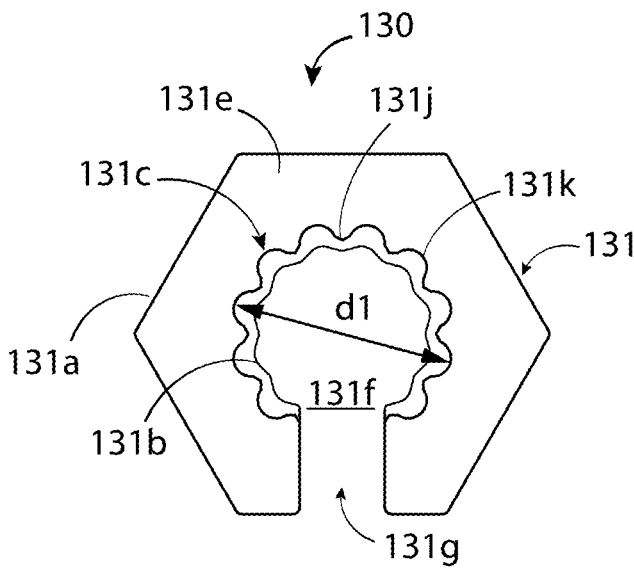
FIGS. 22 and 23 illustrate a left end view and right end view, respectively, of the end cap tool of FIG. 20.
Figure 23:
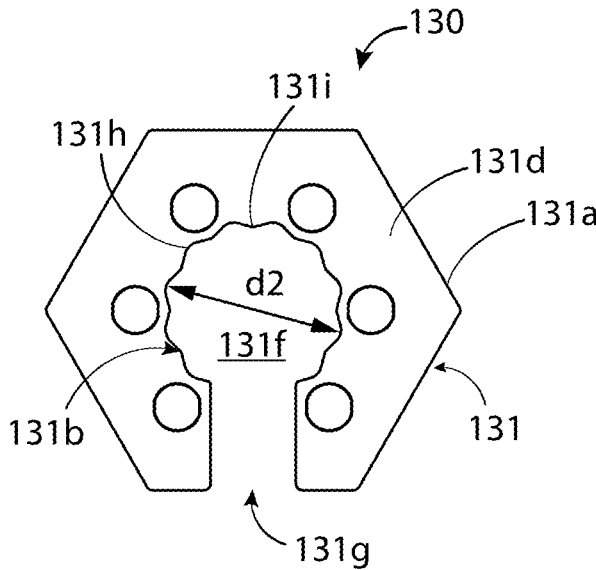

As previously described for FIGS. 24, and 25, the end cap tool 130 may be structured to accommodate different PV electrical connector end caps of different sizes and surface patterns. Referring to FIGS. 20 and 21, the first end cap socket 131*b* and the second end cap socket 131*c* may be positioned on opposite ends of a hollow interior within the end cap tool body 131. Referring to FIGS. 20, 21, and 23, the first end cap socket 131*b* extends into the first end 131*d* of the end cap tool body 131. Referring to FIGS. 20-22, the second end cap socket 131*c* extends into the second end 131*e* of the end cap tool body 131. The first end cap socket 131*b* and the second end cap socket 131*c* extend through a hollow interior 131*f*. The first end cap socket 131*b* may be co-axial with the second end cap socket 131*c* and centered with respect to the outside surface 131*a* of the end cap tool 130. This allows the end cap tool 130 to feel balanced in the hand of the user when the first end cap socket 131*b* or the second end cap socket 131*c* engages a screw-on end cap of a PV electrical connector.

FIGS. 22 and 23 illustrate an example of how the second end cap socket 131*c* (FIG. 22) and the first end cap socket 131*b* (FIG. 23) are structured to accommodate different PV electrical connector screw-on end caps of different sizes and surface patterns. Referring to FIG. 22, the second end cap socket 131*c* includes an opening width of distance d1. Referring to FIG. 23, the first end cap socket 131*b* includes an opening width of distance d2. As illustrated, distance d1 is different than distance d2. Referring to FIG. 22, the surface pattern (or corrugation) of the first end cap socket 131*b* may optionally be different than the second end cap socket 131*c*. As illustrated, the pattern of the second end cap socket 131*c* is more pronounced, with the distance between the peaks and valleys of the pattern being greater than with the first end cap socket 131*b*. For example, the second end cap socket 131*c* could be structured to be compatible with H4-type PV electrical connectors. Many H4-type PV electrical connectors may be compatible with distance d1 equal to approximately 23 mm. Distance d1 may be any dimension suitable for holding and turning a corresponding screw-on end cap of desired type. Referring to FIG. 23, distance d2 may be any dimension suitable for holding and turning a corresponding screw-on end cap of a desired size. For example, the first end cap socket 131*b* may be structured to be compatible with MC4-type PV electrical connectors. For example, many MC4-type PV electrical connectors may be compatible with distance d2 equal to approximately 19 mm and with the pattern shown. Note that these dimensions are examples and are not limiting. The reader may find that a smaller or larger dimension may be suitable for their application. Similarly, the reader may find other suitable surface patterns.

Referring to FIG. 24, the end cap tool body 131 may include a slot-shaped opening 131*g* to pass through an electrical wire 102. Referring to FIGS. 22 and 23, the slot-shaped opening 131*g* may extend from the outside surface 131*a* of the end cap tool 130 into the hollow interior 131*f*. Referring to FIG. 20, the slot-shaped opening 131*g* may extend from the first end 131*d* to the second end 131*e*. This allows the electrical wire 102 of FIG. 24, to pass through both the second end cap socket 131*c* and first end cap socket 131*b* of FIG. 20.

Referring to FIGS. 22 and 23, one or both of the end cap sockets, first end cap socket 131*b* and second end cap socket 131*c*, may be corrugated (i.e., having alternating ridges and grooves). These alternating ridges and grooves may be sized and shaped to engage screw-on end caps of PV electrical connectors that also have alternating ridges and groves. For example, FIG. 23 illustrates concave grooves 131*h* and convex ridges 131*i*. Note that the terms concave, convex, ridges, and grooves, are in relation to the surface of the first end cap socket 131*b*. The concave grooves 131*h* extend concavely into the surface of the first end cap socket 131*b*. The convex ridges 131*i* extend into the hollow interior 131*f* away from the surface of the first end cap socket 131*b*. As illustrated, in FIG. 23, the ridges and grooves may be sized and shaped to engage the outside surface of an MC4-type PV electrical connector. Referring to FIG. 22, the corrugation pattern (i.e., alternating ridges and grooves) of the second end cap socket 131*c* may be sized and shaped to engage a screw-on end cap of a non-MC4-type PV electrical connector such as an H4-type PV electrical connector. The undulations of the alternating ridges and grooves, convex ridges 131*j* and concave grooves 131*k*, is greater for the second end cap socket 131*c* than the first end cap socket 131*b*.

Assembly Example

Figure 26:
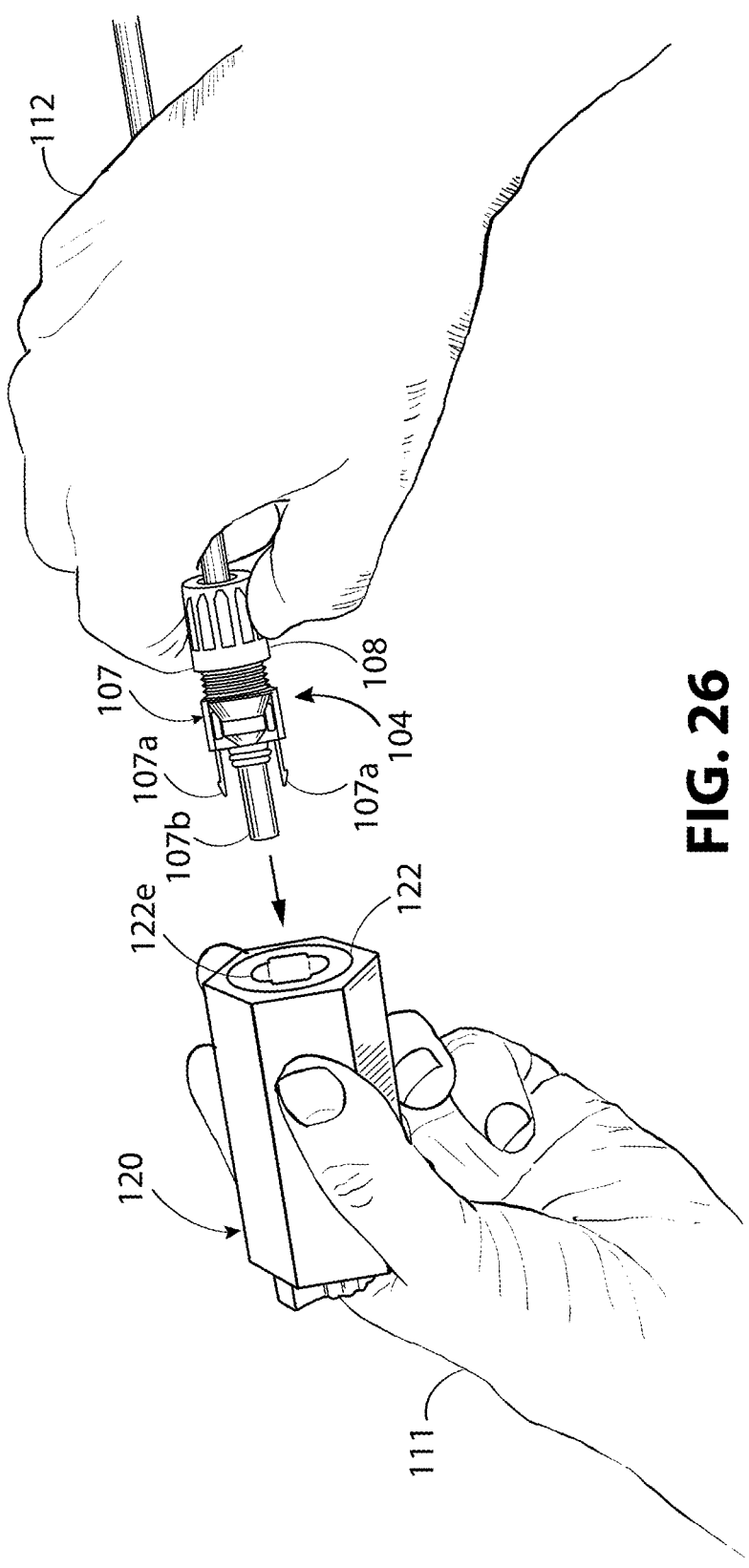
FIGS. 26, 27, and 28 illustrate an example of an assembly sequence using the main body tool and end cap tool of FIGS. 8 and 20, respectively, for assembling a screw-on end cap onto a female PV electrical connector.
Figure 27:
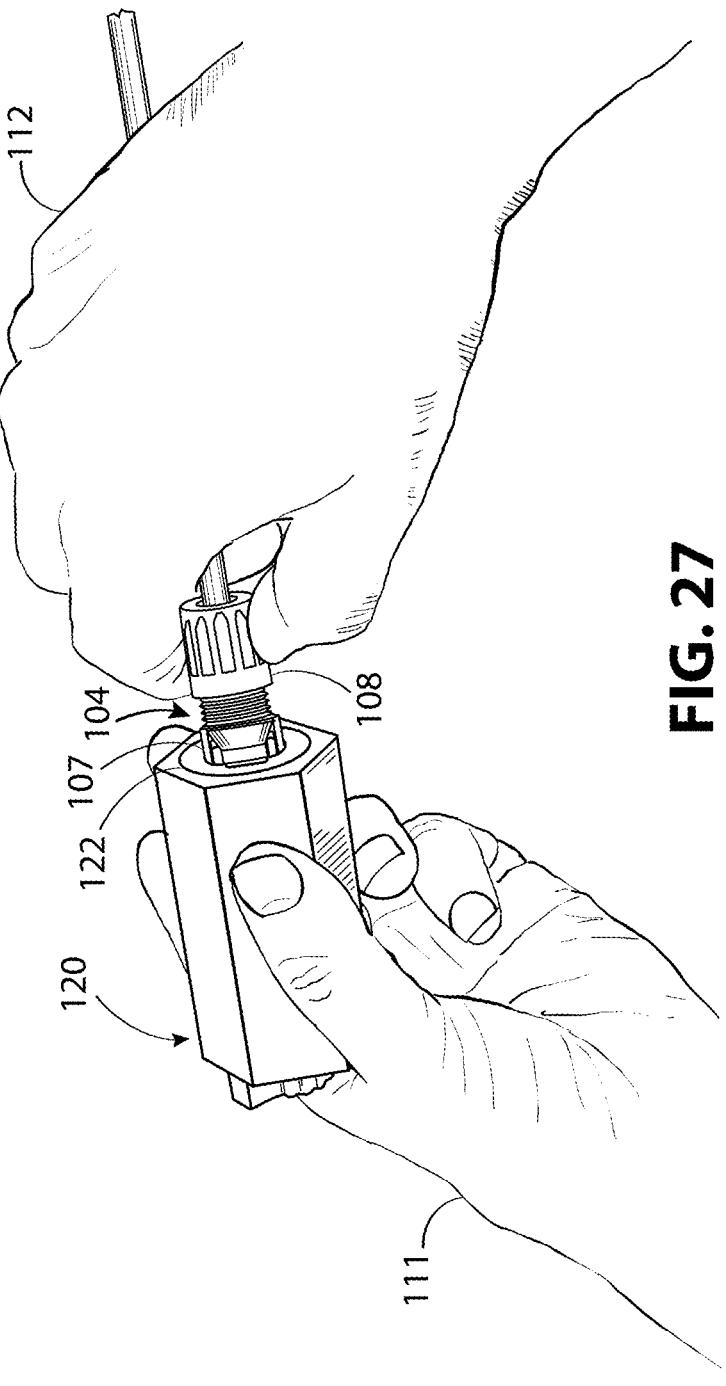
Figure 29:
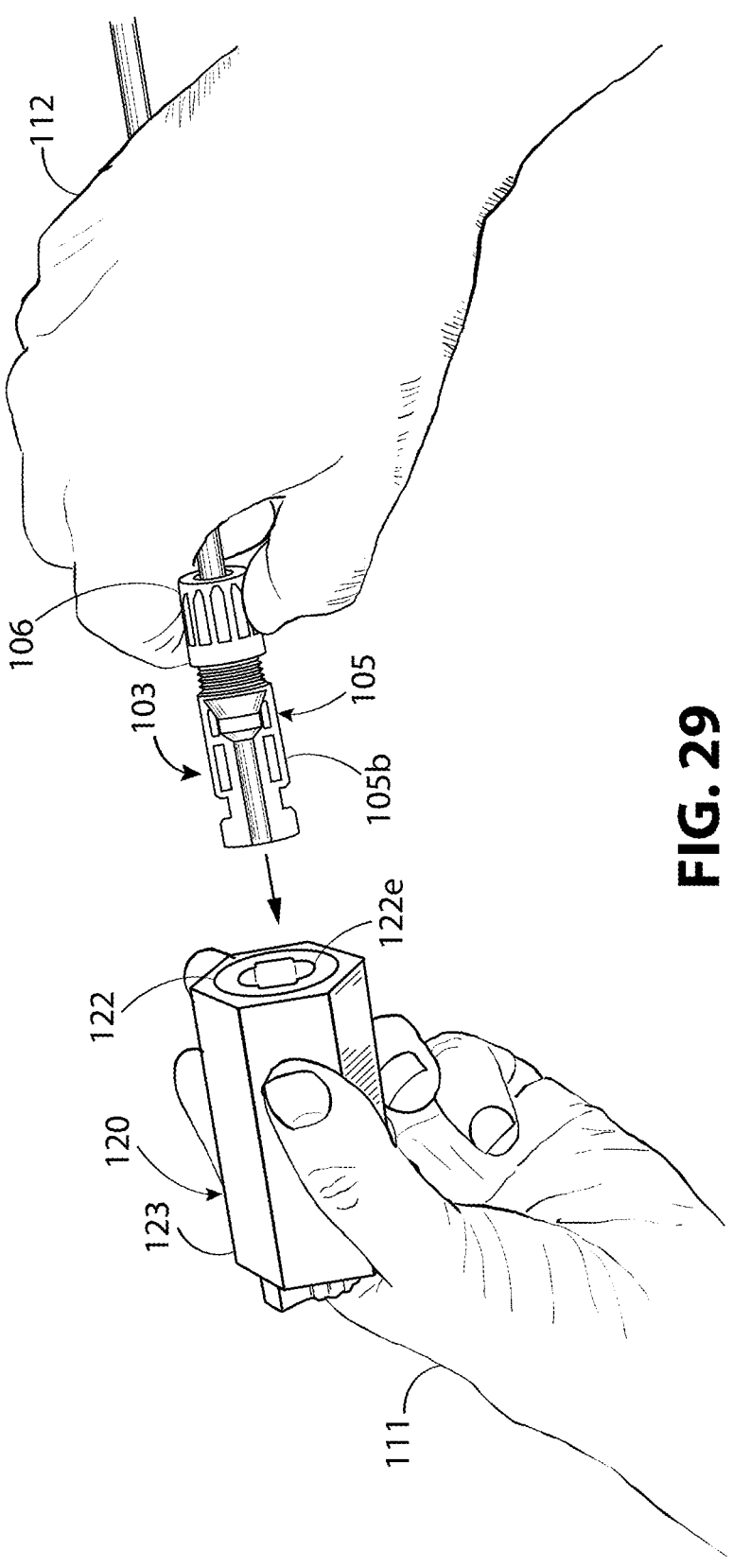
FIGS. 29, 30, and 31 illustrate an example of an assembly sequence using the main body tool and end cap tool of FIGS. 8 and 20, respectively, for assembling a screw-on end cap onto a male PV electrical connector.
Figure 30:
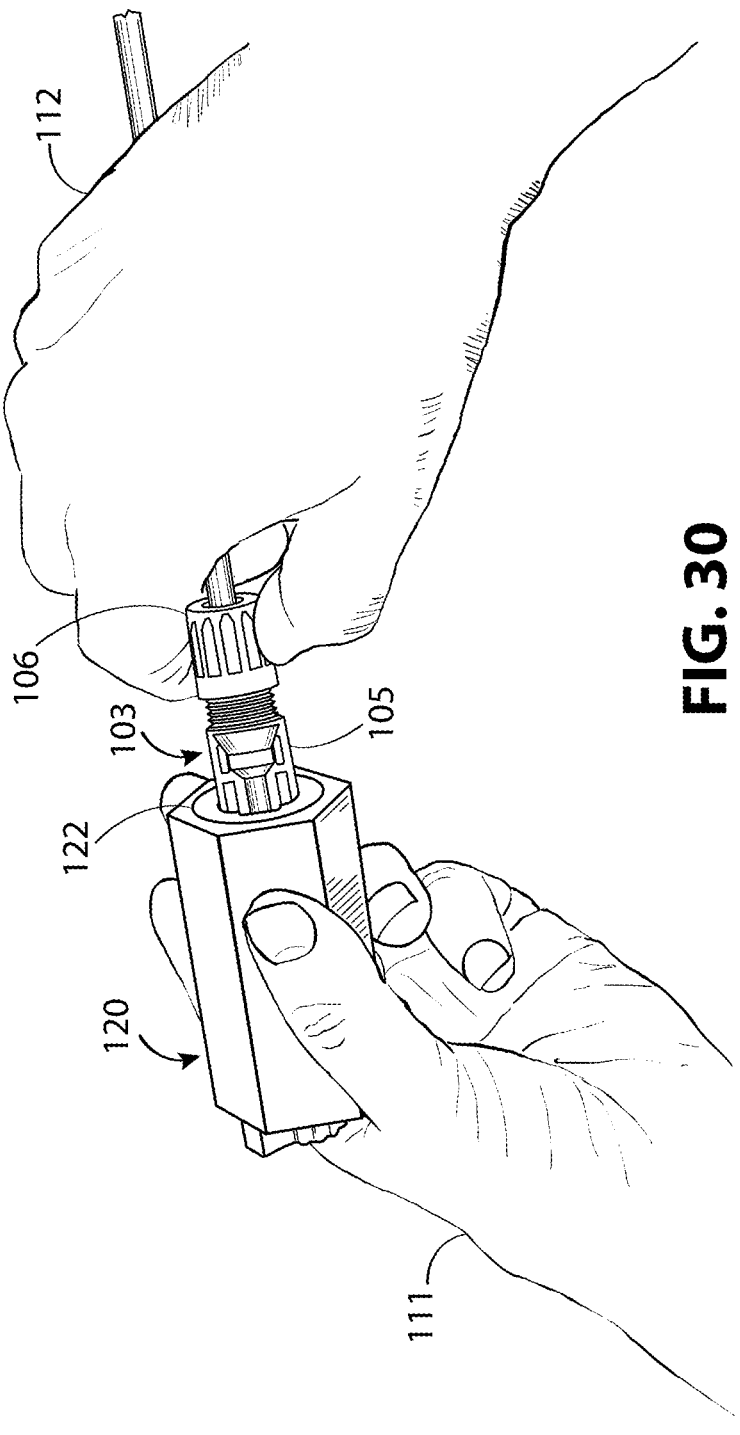

This section discusses, by a non-limiting example, how an installer might assemble the end cap to the main body of a PV electrical connector using a PV electrical connector installation tool that embodies the principles described in this disclosure. FIGS. 26-28 illustrate an example of an assembly sequence using the main body tool and end cap tool of FIGS. 8 and 20, respectively for assembling an end cap onto a female PV electrical connector. FIGS. 29-31 illustrate an example of an assembly sequence using the main body tool and end cap tool of FIGS. 8 and 20, respectively, for assembling an end cap onto a male PV electrical connector. The female PV electrical connector in FIGS. 26-28 and the male PV electrical connectors in FIGS. 29-31 are depicted as MC4-type PV electrical connectors. FIG. 32 illustrates, by flow chart 150, a simplified example of the assembly method or sequence represented in FIGS. 26-28 and also in FIGS. 29-31. In the following discussion, steps in the context of a sequence or method are in reference to FIG. 32, while structure and function are in reference to one or more of FIGS. 26-31 as indicated.

Referring to FIGS. 26, 27, and 32, in step 151, the main body tool 120 receives and holds the main body 107 including the shroud 107*b* (FIG. 26) that surrounds an electrical contact within the main body 107 by a first interior portion of a main body tool. The first interior portion is shown as main body socket 122*e* (FIG. 26) of the cylindrical insert 122. The installer hand-grasping or hand-gripping the main body tool 120 in one hand 111, while grasping the screw-on end cap 108 of the female MC4-type PV electrical connector 104 in the other hand 112. Note because FIG. 26 depicts a female MC4-type PV electrical connector 104, the main body socket 122*e* also receives the pair of locking tabs 107*a*.

Referring to FIGS. 28 and 32, in step 152, the end cap tool 130 receives and holds the screw-on end cap (hidden from view) by a second interior portion of the end cap tool 130. The second interior portion may be, for example, the second end cap socket 131*c* or first end cap socket 131*b* of FIG. 22 and FIG. 23, respectively. In the current example, since the screw-on end cap is for an MC4-type PV electrical connector, the second interior portion would refer to the first end cap socket 131*b* of FIG. 23. Referring back to FIGS. 28 and 32, in step 153, the installer hand-grasps the end cap tool 130 and the main body tool 120, and hand-rotates the end cap tool 130 or the main body tool 120. Here we explicitly mean that the installer may do the following. The installer may hand-rotate, the end cap tool 130 while holding the main body tool stationary. The installer may hand-rotate the main body tool 120 while holding the end cap tool 130 stationary. The installer may hand-rotate both the main body tool 120 and the end cap tool 130.

In FIGS. 28 and 32, in step 154, during hand-rotating of the end cap tool 130 or the main body tool 120, the cylindrical insert 122 remains non-rotatable within the hollow interior of the main body tool 120 (i.e., moves together with the outer shell 123) until the torque exerted by hand-rotating exceeds a predetermined torque limit. Once the torque limit is exceeded, the torque limiter causing the cylindrical insert 122 to rotate within the hollow interior during hand rotation. If the main body tool does not include a torque limiter, for example, in FIGS. 39 and 40, then the installer hand tightens the screw-on end cap by feel and step 154 of the method of FIG. 32 would not be performed. Referring to FIG. 28, the main body tool 120 and end cap tool 130 are sized and shaped for hand-gripping. The size and shape of the main body tool 120 and end cap tool 130 facilitates transmission of tactile sensation to the installer's hands.

The same method or sequence from FIG. 32 of steps 151-154 as described above, apply to a male PV electrical connector, such as the male MC4-type PV electrical connector 103 depicted in FIGS. 29-31.

Referring to FIGS. 29, 30, and 32, in step 151, the main body tool 120 receives and holds the main body 105, including the shroud 105*b* (FIG. 29), by a first interior portion of the main body tool 120. The shroud 105*b* surrounds an electrical contact within the main body 105. In FIG. 29, the first interior portion is the main body socket 122*e* of the cylindrical insert 122. FIGS. 29 and 30 illustrate the installer hand-grasping, or hand-gripping, the outer shell 123 of the main body tool 120 in one hand 111 while hand-grasping, or hand-gripping, the screw-on end cap 106 of the male MC4-type PV electrical connector 103 in the other hand 112.

Referring to FIGS. 31 and 32, in step 152, the end cap tool 130 receives and holds the screw-on end cap (hidden from view) by a second interior portion of an end cap tool. As previously discussed, the second interior portion may be, for example, the second end cap socket 131*c* or first end cap socket 131*b* of FIG. 22 and FIG. 23, respectively.

Referring back to FIGS. 31 and 32, in step 153, the installer hand-grasps the end cap tool 130 and the main body tool 120, and hand-rotates the end cap tool 130 or the main body tool 120. As discussed in the last example (FIGS. 28 and 32), here we explicitly mean the following. The installer may hand-rotate the end cap tool 130 while holding the main body tool stationary. The installer may hand-rotate the main body tool 120 while holding the end cap tool 130 stationary. The installer may hand-rotate both the main body tool 120 and the end cap tool 130.

Referring to FIGS. 31 and 32, in step 154, as previously discussed, in this example, during hand-rotating of the end cap tool 130 or the main body tool 120, the cylindrical insert 122 remains non-rotatable within the hollow interior of the main body tool 120 (i.e., moves together with the outer shell 123) until the torque exerted by hand-rotation exceeds a predetermined torque limit. With the predetermined torque limit exceeded, the torque limiter causes the cylindrical insert 122 to rotate within the hollow interior during hand rotation. With the cylindrical insert 122 rotating relative to the outer shell 123, hand turning either the main body tool 120 or the end cap tool 130 will not tighten the screw-on end cap. If there is no torque limiter, then step 154 does not apply.

Figures 33, 34, 35:
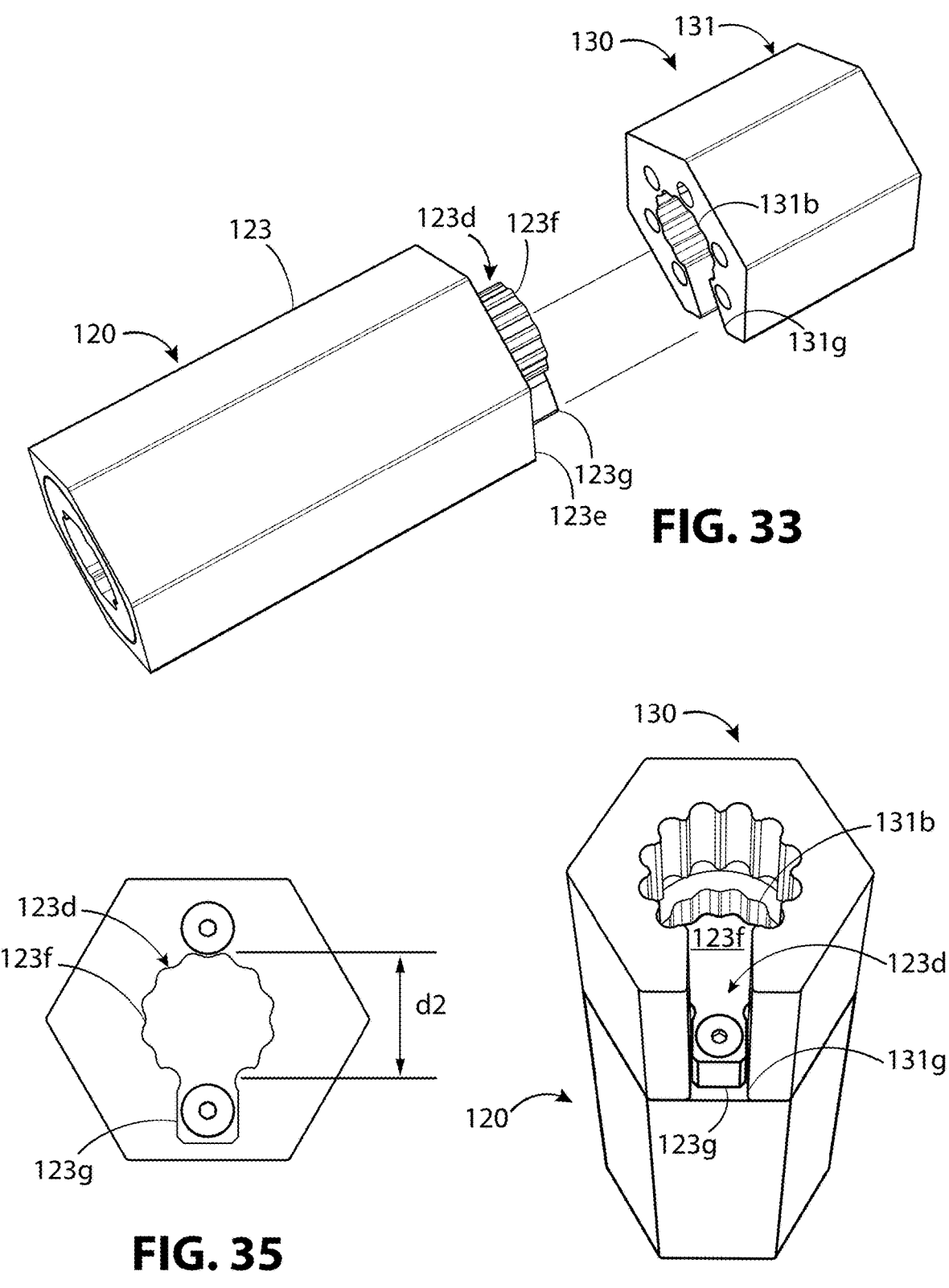
FIGS. 33 and 34 illustrate magnetic securement of the end cap tool to the main body tool.
FIG. 35 illustrates, in right end view, the main body tool showing the relative dimension of the end cap socket coupler.

Referring to FIGS. 33 and 34, the two sub-tools, the main body tool 120 and the end cap tool 130, can be attached together magnetically for storage. Referring to FIG. 33, the end-cap tool receiver 123*d* extends from the closed end 123*e* of the outer shell 123 of the main body tool 120. Referring to FIGS. 33-35, the end-cap tool receiver 123*d* includes an end cap socket coupler 123*f* and an alignment-key 123*g* (i.e., an alignment tab) that projects outward and away from the end cap socket coupler 123*f*. As illustrated, it projects radially away from the end cap socket coupler 123*f*. Referring to FIGS. 33 and 34, the end cap socket coupler 123*f* and alignment-key 123*g* are received by the first end cap socket 131*b* and slot-shaped opening 131*g*, respectively. The slot-shaped opening 131*g* acts as a keyway, to receive the alignment-key 123*g*, and to rotationally orient the main body tool 120 with the end cap tool 130. Referring to FIG. 33, assures that magnets within the outer shell 123 of the main body tool 120 and the end cap tool body 131 align.

Referring to FIG. 35, the end cap socket coupler 123*f* is illustrated with a width of distance d2, which matches the width of the first end cap socket 131*b* (FIG. 23). The corrugation pattern of alternating ridges and grooves on the end cap socket coupler 123*f* may be complementary to the corrugation pattern on the first end cap socket 131*b* to assure that the parts mate.

FIG. 36 shows an exploded view of the end cap tool 130 with magnets 143, 144, 145, 146, 147, 148 exploded away from the end cap tool body 131. Magnets 143, 144, 145, 146, 147, 148 are positioned within blind apertures 131*m*, 131*n*, 131*o*, 131*p*, 131*q*, 131*r*, respectively. Referring to FIG. 37, magnets 113, 114, 115, 116, 117, 118 are positioned within the torque limiter assembly 121, under the closed end 123*e* of the outer shell 123. The magnets 114, 115, 116, 117, 118 and torque limiter assembly 121 are illustrated as dashed lines to indicate they are hidden from view with the main body tool 120.

FIG. 19 illustrates the torque limiter assembly 121 with magnets 113, 114, 115, 116, 117, 118 exploded away from cylindrical sleeve 124. The magnets 113, 114, 115, 116, 117, 118 are positioned within blind apertures 124*i*, 124*j*, 124*k*, 124*m*, 124*n*, 1240 respectively, within the cylindrical sleeve 124.

FIG. 38 illustrates main body tool 120 magnetically secured to end cap tool 130 for storage or transportation. The outer shell 123 of main body tool 120 is cutaway to expose the torque limiter assembly 121 and show how magnets within the torque limiter assembly 121 align with the magnets within the end cap tool 130. FIG. 38 shows the ends of magnets 113, 117, 118 within the cylindrical sleeve 124 aligned against the ends of magnets 143, 147, 148 within the end cap tool body 131, respectively. Magnets within the torque limiter assembly 121 are shown in dashed lines to indicate that they are hidden from view within the cylindrical sleeve 124. Similarly, magnets within the end cap tool body 131 are shown in dashed lines to indicate that they are hidden from view. The magnets are aligned end-to-end with opposite poles facing, so that the magnets within the end cap tool 130 attract the magnets within the main body tool 120. Aligning magnets as described above allows the outer shell 123 of the main body tool 120 to be made of non-magnetic materials such as aluminum, stainless steel, or plastic. FIG. 38 also shows the relationship between cylindrical insert 122 and torque limiter assembly 121.

Conclusion and Variations

The Summary, Detailed Description, and figures describe an electrical connector installation tool for assembling PV electrical connectors. This disclosure provides examples of devices, components, and configurations to help the reader understand the described general principles. The following are examples of variations and combinations of different components, structures, and features of the electrical connector installation tool that still adhere to the general principles.

Figure 39:
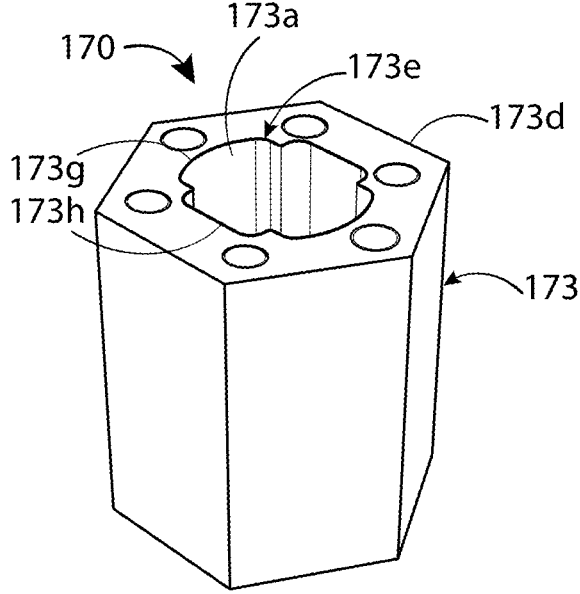
FIGS. 39 and 40 illustrate an example of an alternative main body tool embodying principles of the present disclosure.
Figure 40:
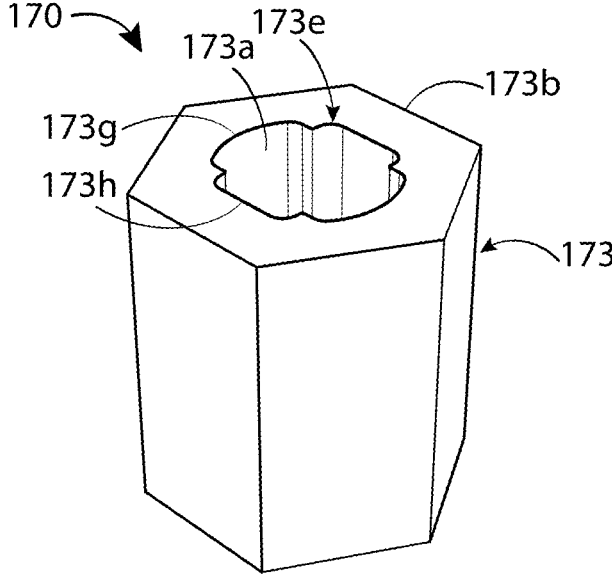

The main body tool 120, as shown in FIGS. 10 and 12, includes a torque limiter. FIGS. 39 and 40 illustrate an example of a main body tool 170 without a torque limiter. Referring to FIGS. 39 and 40, the outer shell 173 of the main body tool 170 includes a main body socket 173*e* that extends through the first end 173*d* (FIG. 39) and the second end 173*b* (FIG. 40). Like the main body tool 120 of FIG. 8, the main body tool 170 optionally may be without a lengthwise slot. The main body socket 173*e* forms a hollow interior 173*a* of the outer shell 173 of the main body tool 170. The main body socket 173*e* may be sized and shaped to engage and hold the main body of a PV electrical connector such as an MC4-type PV electrical connector and an H4-type PV electrical connector. The main body socket 173e may be sized and shaped as the main body socket 122e of FIG. 11. The first slot 173g and second slot 173h (FIGS. 39 and 40) may be sized and shaped as the first slot 122g and second slot 122h (FIG. 11), respectively. Continuing to refer to FIGS. 39 and 40, the main body tool 170 does not have a blind aperture, like the blind aperture 122i of FIG. 11. This is because the main body socket 173e extends from the first end 173d (FIG. 39) through the second end 173b (FIG. 40) of the outer shell 173, so a blind aperture is not required. However, this does not make the main body tool 120 of FIGS. 10 and 11 mutually exclusive from the main body tool 170 of FIGS. 39 and 40. One or more blind apertures, like the blind aperture 122i from FIG. 11 could be included in the outer shell 173 of FIGS. 39 and 40 under some circumstances. For example, if the main body socket was on one end of the main body tool but not the other end, then a blind aperture could be added to receive the shroud of the female PV electrical connector.

Referring to FIG. 26, the discussion for FIGS. 26-28 describes using the electrical connector installation tool to assemble the main body 107 to the screw-on end cap 108 of a female PV electrical connector, for example, a female MC4-type PV electrical connector 104. Referring to FIGS. 29 and 30, the discussion of FIGS. 29-31 describe how an installer could use similar principles to assemble the screw-on end cap 106 to the main body 105 of a male PV electrical connector, for example, a male MC4-type PV electrical connector 103. The same principles discussed in FIGS. 26-28 can be applied to installing other female PV electrical connectors. These female PV electrical connectors may include female non-MC4-type PV electrical connectors such as female H4-type PV electrical connectors. Similarly, the same principles discussed in FIGS. 29-31 can be applied to installing other male PV electrical connectors. These male PV electrical connectors may include male non-MC4-type PV electrical connectors such as male H4-type PV electrical connectors.

FIGS. 26-31 illustrate using one hand 111 to hand-grasp the main body tool 120 and the other hand 112 to hand-grasp the end cap tool 130. In FIGS. 26-31, the one hand 111 is depicted as the installer's left hand and the other hand 112 is depicted as the installer's right hand. This is an illustrative example and does not imply an advantage of a particular hand used to hand-grasp the main body tool 120 or a particular hand to grasp the end cap tool 130.

FIG. 26 illustrates moving the main body 107 toward the main body tool 120. The main body tool 120 could instead be moved toward the main body 107 or they could both be moved toward one another. Similarly, FIG. 29 illustrates moving the main body 105 toward the main body tool 120. The main body tool 120 could instead be moved toward the main body 105 or they could both be moved toward one another.

In the method in flow chart 150 of FIG. 32, the order of step 151 and step 152 could be reversed. The installer could receive and hold the screw-on end cap by the second interior portion of the end cap tool before receiving and holding the main body by the first interior portion of the main body tool. In this example, in FIGS. 26 and 29, the installer would hand-grasp the end cap tool instead of the screw-on end cap 108 (FIG. 26) or screw-on end cap 106 (FIG. 29).

In FIGS. 23 and 24, the end cap tool 130 is illustrated seating and engaging an MC4-type PV electrical connector and an H4-type PV electrical connector, respectively. The Multi-Contact Group, which is now Stäubli International AG, originally developed MC4 PV electrical connectors.

Amphenol Corporation developed H4 electrical connectors. Other manufacturers have developed MC4-type or MC4-like electrical connectors. The MC4-type electrical connectors have the same size screw-on end caps as those manufactured by Stäubli, while some of the MC4-like electrical connectors may have larger screw-on end caps. For example, electrical connectors manufactured under the tradename RENOGY by RNG International, Inc., have screw-on end caps similar in size as H4-type PV electrical connectors. Referring to FIG. 20, one of the advantages of sizing the first end cap socket 131b, and the second end cap socket 131c, to MC4-type and H4-type PV electrical connectors, respectively, is that the tool can accommodate common variations in PV electrical connector screw-on end cap sizes. The first end cap socket 131b, and second end cap socket 131c, is not limited to the sizes and opening styles illustrated. Using the principles discussed in this disclosure, the Inventor envisions a first end cap socket and a second end cap socket, that can accommodate other PV electrical connector styles that currently exist on the market or may exist in the future. For example, the first end cap socket 131b could be sized to accommodate an MC4-type screw-on end cap, while the second end cap socket 131c could be sized to accommodate a T4-type PV electrical connector. An example of a T4-type PV connector, the original T4 PV connector manufactured by Than Solar Connectors.

Figure 8:
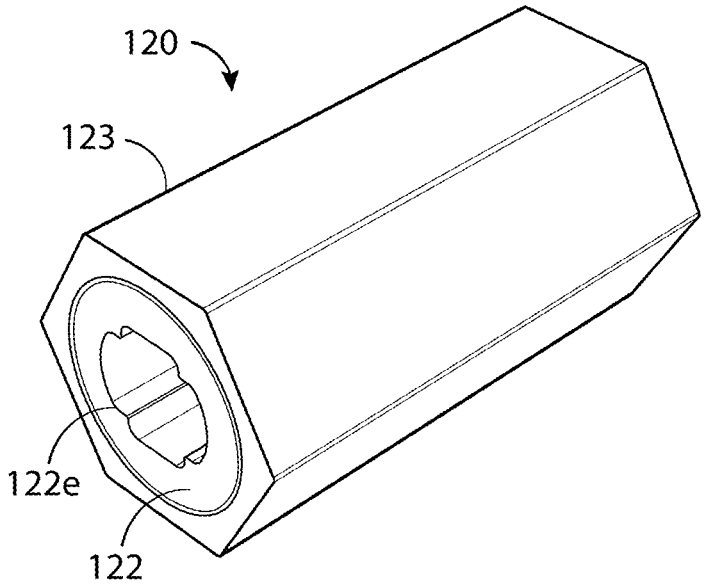
FIGS. 8 and 9 illustrate an example of a main body tool in accordance with the present disclosure in left perspective view and a right perspective view, respectively.

The end cap tool 130 of FIG. 20, and the main body tool 120 of FIG. 8, are sized to be comfortably gripped by an installer. For example, a vertex-to-vertex width of 0.043 m (1.7 in.) is suitable for an average-sized hand. Depending on the installer's hand size, a width of 0.030 m (1.2 in.) to 0.055 m (2.2 in.) may also be suitable for comfortable gripping. The inventive concept is not limited by the size or width of the end cap tool 130 (FIG. 20) or main body tool 120 (FIG. 8) as illustrated, and is not limited to the ranges discussed above. Some installers may wish to use sizes that fit outside these ranges.

Figure 9:
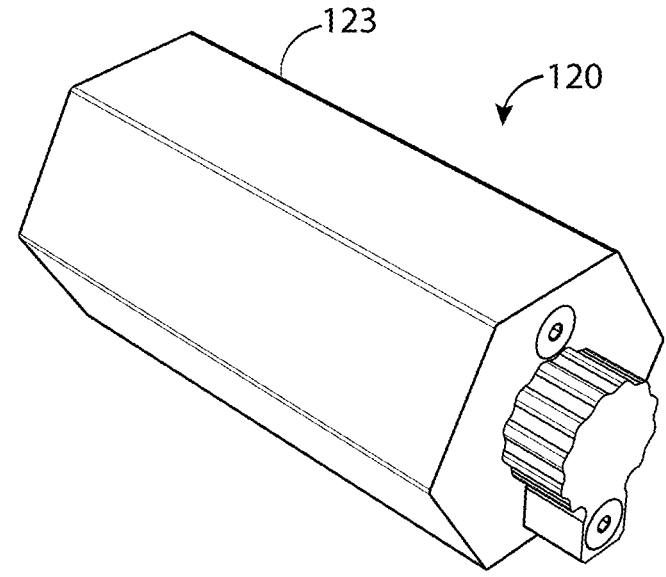

In order to help facilitate hand-gripping around the body of the end cap tool 130, the end cap tool 130 may comprise a slotted tube, as illustrated in FIGS. 20, 22, and 23. This slotted tube may be sized and shaped to be hand gripped around the outside of the tube, for example, as illustrated in FIGS. 26-31. Similarly, the outer shell 123 of the main body tool 120 may comprise a tube, for example, as illustrated in FIGS. 8 and 9. The tube may be sized and shaped to be hand gripped around the outside of the tube, as illustrated in FIGS. 26-31. The Inventor found that a hexagonally-shaped outside surface of the end cap tool 130 or the main body tool 120 helps accommodate hand-gripping as illustrated in FIGS. 28 and 31. While a hexagonally-shaped outside surface may be helpful for gripping, the outside surface of the main body tool 120 and end cap tool 130 is not limited to these shapes. For example, a textured cylindrical shape, or a cylindrical shape with a low to medium durometer outside coating that is optimized for hand-gripping. The cylindrical shape, for example, may have a circular or oval cross section.

While hand-gripping overcomes described shortcomings of using a tool with a handle, there may be some instances when an installer would like to use a tool with a handle. For example, in FIGS. 22 and 23, a handle could project radially away from the outside surface of the end cap tool body 131. In addition, using the principles discussed in this disclosure for FIGS. 20-23, the end cap tool body 131 could be applied to a device similar to the MC4-type connector wrench 110 shown in FIG. 4.

Examples within this disclosure have described the end cap tool as being a slotted tube and the main body tool as being a tube. As discussed in the definition section, for the purpose of this disclosure, a tube and slotted tube may be cylindrical or non-cylindrical. For example, the end cap tool 130 as shown in FIGS. 20, 22, and 23 is a slotted-hexagonal prism with a hollow interior. The end cap tool body 131 as shown in FIG. 20 is a hexagonal prism with a hollow interior. In accordance with this disclosure, a hexagonal prism with a hollow interior falls within the definition of tube. Likewise, a slotted-hexagonal prism with a hollow interior falls within the definition of a slotted tube.

As described in the discussion of FIGS. 22 and 23, one or both of the end cap sockets may be corrugated (i.e., having alternating ridges and grooves). Note the ridges and grooves are not limited to the convex ridges 131*i* and concave grooves 131*h* illustrated in FIG. 23. For example, for MC4-type PV electrical connectors, the bottom of the grooves may be flat (linear) and approximately follow the arc of the circular opening defining the boundary of the opening. The ridges and grooves can be any shape or depth appropriate for the receiving and retaining the targeted MC4-type PV electrical connector or the targeted non-MC4 type connector.

Referring to FIG. 33, the end cap socket coupler 123*f* is sized and shaped to receive the first end cap socket 131*b* because the magnets within the end cap tool 130 are positioned on the end where the first end cap socket 131*b* is located. If the magnets were positioned on the opposite end where the second end cap socket 131*c* (FIG. 20) is located, then the end cap socket coupler 123*f* would be sized and shaped to receive the second end cap socket 131*c* (FIG. 20).

The alignment features, such as the end cap socket coupler 123*f* and alignment-key 123*g* in FIG. 35, and the arrangement of magnets in FIGS. 36 and 37 allow the main body tool 120 (FIG. 37) and end cap tool 130 (FIG. 36) to be non-magnetic yet still be magnetically connected together for storage and transportation. Non-magnetic materials, like anodized aluminum are lighter weight and more convenient to transport than some magnetic materials like steel. Examples of non-magnetic materials that may be suitable for the outer shell 123 of the main body tool 120, both of FIG. 8, and the end cap tool body 131 of the end cap tool 130, both of FIG. 20, include, but are not limited to, aluminum, brass, 316-type stainless steel, 304-type stainless steel, or various plastic materials. Examples of plastic material that may be suitable, include materials such as acrylonitrile butadiene styrene (ABS), nylon, glass filled nylon (such as XNGL), or UV-resistant materials such as high-density polyethylene (HDPE). Referring to FIG. 33, the end cap tool body 131 and the outer shell 123 can be made from dual-durometer plastics. For example, a plastic material with a higher durometer (i.e. harder plastic) to engage the electrical connector. A softer plastic can surround the harder plastic to form the outer surface of the end cap tool body 131 or the outer shell 123, for better gripping. The end cap tool body 131 and outer shell 123 could be made from a combination of metal and plastic. For example, the material engaging the electrical connector could be metal, such as aluminum, and the outer surface of the tool could be a medium soft plastic (i.e., medium durometer) for easy comfortable gripping and electrical insulation. Other non-magnetic materials or magnetic materials may be used, as long as they are suitable for use as a hand tool that tightens or loosens the screw-on end cap of the electrical connectors described and their equivalents.

While non-magnetic materials have advantages, there are instances where magnetic materials may be desirable and circumstances lend advantage to the end cap tool or main body tool being made of a magnetic material. Examples of magnetic materials suitable for use as the outer shell 123 (FIG. 8) and the end cap tool body 131 (FIG. 20) include, but are not limited to galvanized steel or 430-type stainless steel.

The cylindrical insert 122, the outer shell 123 and cylindrical sleeve 124 of FIG. 10, and the end cap tool body 131 of FIG. 20 may be manufactured by various manufacturing methods. For example, they may be machined, cast, or 3D printed. They may be molded if made from plastic or other moldable material.

FIGS. 20, 22 and 23 show an example of a slot-shaped opening 131*g*. These figures illustrate an example of the slot-shaped opening's shape and proportion. The slot-shaped opening is not limited to the illustrated shape or proportion. Referring to FIG. 20, the slot-shaped opening 131*g* may be any proportion with respect to the end cap tool body 131 or any shape that allows an electrical wire of the electrical connector cable assembly to pass through into the end cap tool body 131. For example, the slot-shaped opening could be wider or narrower in proportion to the end cap tool body 131. It could include parallel sides, as illustrated, or tapered-in sides, tapered-out sides, or arcuate sides.

Referring to FIG. 12, the torque limiter assembly 121 is illustrated as being attached to the outer shell 123 by threaded fasteners 127, 128. This provides for removable attachment, so that the main body tool 120 may be disassembled for servicing. Alternatively, the torque limiter assembly 121 may be secured to the outer shell 123 by permanent attachment such as by welding, riveting, taping, or adhesive.

The variations described, the general principles taught, and undescribed variations, devices, and systems that encompass the general principles described in this disclosure, are within the claim's scope.

The invention claimed is:

1. An electrical connector installation tool for assembling a photovoltaic (PV) electrical connector, the PV electrical connector including a main body and a screw-on end cap threadedly fastenable to the main body, the main body including a shroud surrounding an electrical contact, comprising:

a main body tool including an outer shell with an outside surface that is sized and shaped for hand-gripping and with a hollow interior, a cylindrical insert rotatable within the hollow interior of the outer shell, and a torque limiter within the hollow interior, structured to engage the cylindrical insert and allow rotation of the cylindrical insert when a predetermined torque limit is exceeded; and the cylindrical insert is structured to receive and hold the shroud surrounding the electrical contact of a male PV electrical connector or a female PV electrical connector.

2. The electrical connector installation tool of claim 1, wherein: the cylindrical insert is structured to receive and hold the shroud surrounding the electrical contact of a male MC4-type PV electrical connector or a female MC4-type PV electrical connector and a pair of locking tabs of the female MC4-type PV electrical connector.

3. The electrical connector installation tool of claim 1, further including:

a cylindrical sleeve, the torque limiter is positioned within the cylindrical sleeve, the cylindrical sleeve is secured to the outer shell within the hollow interior.

\* \* \* \* \*